US010592534B2

(12) United States Patent
Gong

(10) Patent No.: US 10,592,534 B2
(45) Date of Patent: Mar. 17, 2020

(54) AUTOMATED AGGREGATION OF SOCIAL CONTACT GROUPS

(71) Applicant: Microsoft Technology Licensing, LLC, Redmond, WA (US)

(72) Inventor: Zaoyang Gong, Sammamish, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 649 days.

(21) Appl. No.: 15/044,533

(22) Filed: Feb. 16, 2016

(65) Prior Publication Data

US 2017/0235812 A1 Aug. 17, 2017

(51) Int. Cl.
*G06F 16/951* (2019.01)
*G06Q 50/00* (2012.01)
*G06Q 10/10* (2012.01)
*G06F 16/28* (2019.01)
*G06F 16/955* (2019.01)
*H04L 29/08* (2006.01)

(52) U.S. Cl.
CPC .......... *G06F 16/285* (2019.01); *G06F 16/288* (2019.01); *G06F 16/951* (2019.01); *G06F 16/955* (2019.01); *G06Q 10/10* (2013.01); *G06Q 50/01* (2013.01); *H04L 67/306* (2013.01)

(58) Field of Classification Search
CPC ...... G06Q 10/109; G06Q 10/10; G06Q 50/01; G06Q 10/105; H04L 67/306; H04L 51/32
See application file for complete search history.

(56) References Cited

U.S. PATENT DOCUMENTS

| 7,480,712 | B2 | 1/2009 | Moy | |
| 8,156,183 | B2 | 4/2012 | Polis et al. | |
| 8,446,842 | B2 | 5/2013 | Cao et al. | |
| 8,825,761 | B2 | 9/2014 | Dunko | |
| 9,165,327 | B1* | 10/2015 | Hyndman | G06Q 50/01 |
| 2001/0013050 | A1* | 8/2001 | Shah | G06Q 10/109 |
| | | | | 709/202 |
| 2003/0065721 | A1 | 4/2003 | Roskind | |
| 2005/0102328 | A1 | 5/2005 | Ring et al. | |

(Continued)

OTHER PUBLICATIONS

"Google Play: Social Media All in One App", Published on: May 19, 2015, Available at: https://play.google.com/store/apps/details?id=com.brtech.allin1social&hl=en (2 pages total).

*Primary Examiner* — Jesse P Frumkin
(74) *Attorney, Agent, or Firm* — Mark K. Young; Mayer & Williams PC

(57) ABSTRACT

An electronic device is configured with a social contact group aggregation system that operates to identify similar groups of contacts that are associated with different social applications and aggregate those groups into a single, unified group with which the device user may interact. When the device user uses a social application to create or import a new group of social contacts, the aggregation system can apply one or more of various aggregation factors to determine if the new group matches a pre-existing group and then aggregate the new group into the existing group if a match is identified. The aggregation factors illustratively include the similarity of names between the new and an existing group, the degree to which social contacts in the groups are already linked, the similarity of profile information among members of the groups, and other associative factors.

18 Claims, 20 Drawing Sheets

(56) References Cited

U.S. PATENT DOCUMENTS

| | | | |
|---|---|---|---|
| 2005/0198131 A1* | 9/2005 | Appelman | G06Q 10/10 709/204 |
| 2009/0043843 A1* | 2/2009 | Milewski | H04L 51/04 709/204 |
| 2009/0300502 A1* | 12/2009 | Johnson | G06Q 10/00 715/733 |
| 2010/0150407 A1 | 6/2010 | Cheswick et al. | |
| 2011/0004561 A1* | 1/2011 | Shahine | G06Q 10/107 705/319 |
| 2011/0055234 A1* | 3/2011 | Miettinen | G06F 17/30985 707/755 |
| 2011/0307455 A1 | 12/2011 | Gupta et al. | |
| 2012/0117036 A1 | 5/2012 | Lester et al. | |
| 2012/0143969 A1* | 6/2012 | Shenoy | G06Q 10/10 709/206 |
| 2013/0031171 A1* | 1/2013 | Serena | G06Q 50/01 709/204 |
| 2013/0066922 A1 | 3/2013 | Jang et al. | |
| 2013/0080914 A1* | 3/2013 | Souza | G06Q 10/109 715/752 |
| 2013/0097124 A1* | 4/2013 | de Souza | G06Q 10/10 707/692 |
| 2013/0103688 A1* | 4/2013 | Tien | G06Q 10/105 707/737 |
| 2013/0111356 A1 | 5/2013 | Vasudevan et al. | |
| 2013/0217365 A1 | 8/2013 | Ramnani | |
| 2013/0318085 A1 | 11/2013 | Pepper | |
| 2014/0006523 A1* | 1/2014 | Hofman | G06Q 10/10 709/206 |
| 2014/0122605 A1* | 5/2014 | Merom | G06Q 10/10 709/204 |
| 2014/0207865 A1* | 7/2014 | Carr | H04L 67/2833 709/204 |
| 2014/0222793 A1* | 8/2014 | Sadkin | G06F 17/3053 707/723 |
| 2014/0337344 A1* | 11/2014 | Wu | G06K 9/00677 707/738 |
| 2014/0337448 A1 | 11/2014 | Kline et al. | |
| 2015/0112990 A1 | 4/2015 | van Os et al. | |
| 2015/0281144 A1* | 10/2015 | Staerk | H04L 51/046 715/752 |
| 2015/0281399 A1* | 10/2015 | Staerk | G06Q 10/10 709/203 |
| 2016/0239882 A1* | 8/2016 | Garcia | G06Q 30/0282 |
| 2017/0289306 A1* | 10/2017 | Tan | H04L 67/14 |
| 2018/0091469 A1* | 3/2018 | Tseng | H04L 51/32 |

\* cited by examiner

AUTOMATED AGGREGATION OF SOCIAL CONTACT GROUPS

BACKGROUND

Users may employ computing devices such as personal computers (PCs), tablet computers, and smartphones to keep in touch with their social contacts including friends, families, and co-workers, for example.

SUMMARY

An electronic device such as a personal computer, tablet computer, smartphone, and the like is configured with a social contact group aggregation system that operates on the device to identify similar groups of contacts that are associated with different social applications and aggregate those groups into a single, unified group with which the device user may interact. When the device user uses a social application to create or import a new group of social contacts, the aggregation system can apply one or more of various aggregation factors to determine if the new group matches pre-existing groups and then aggregate the new group into the existing group if a match is identified. The aggregation factors illustratively include the similarity of names between the new group and an existing group, the degree to which social contacts in the groups are already linked (i.e., in which two or more versions of the same social contact are associated and can be displayed together, for example, on a single contact card), the similarity of profile information among members of the groups, and other associative factors.

The social contact group aggregation system enables groups to be collected across multiple social applications and then rendered together, for example, at one location on the electronic device using a common user interface (UI) such as a hub, pivot, start screen tile or element, or other form of centralized rendering. Content from the social applications such as messages, notifications, and the like can also be aggregated and rendered together with one or more of the aggregated groups of social contacts. Such group aggregation across social applications can provide the user with a convenient and efficient way to keep in touch with contacts from different social applications without needing to launch and go through each social application one by one.

In various illustrative embodiments, the social contact group aggregation system can be integrated into an operating system (OS) running on the electronic device. The system can expose various UIs responsive to one or more of physical interaction, gestures, and/or voice to enable the device user to set preferences, provide inputs to the system, and control aspects of the group aggregation and/or rendering of the aggregated groups on the device. The system can perform the social contact group aggregation automatically or upon receipt of user input at the UI in response to a recommendation or other notification from the system.

The social contact group aggregation system can advantageously improve operation of the electronic device by reducing the load on device resources such as processor cycles, memory, storage, network bandwidth, and power, many of which may be limited such as with mobile and/or battery powered devices. For example, group aggregation across social applications can typically reduce the number of applications the user needs to open and operate in order to stay current with the user's social contacts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

Figure 1:
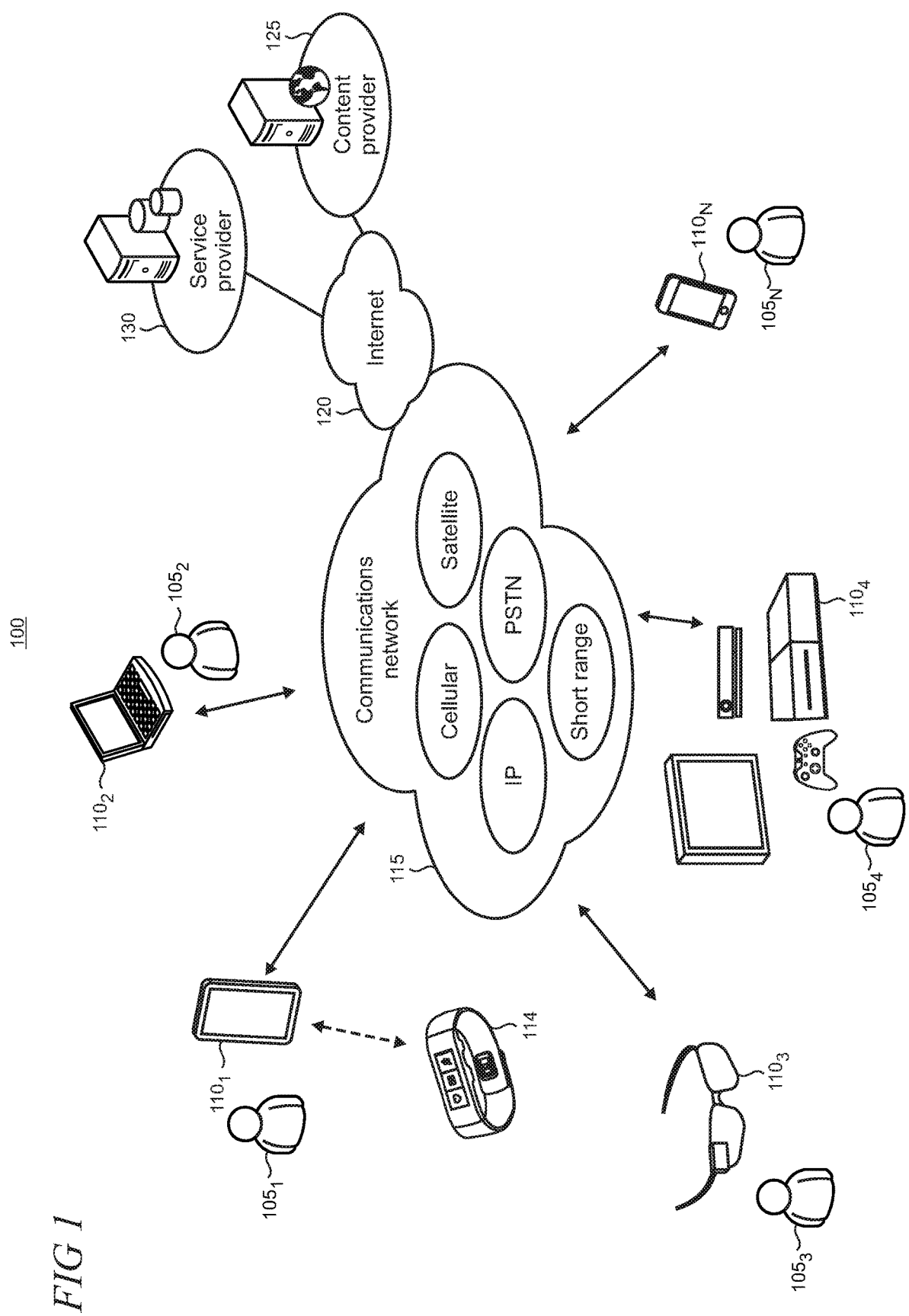
FIG. 1 shows an illustrative environment in which devices having communications capabilities interact over one or more networks.

Like reference numerals indicate like elements in the drawings. Elements are not drawn to scale unless otherwise indicated. The particular UIs displayed in the drawings are provided for illustrative purposes and can vary from what is shown according to the needs of a particular implementation. While UIs are shown in portrait mode in the drawings, the present arrangement may also be implemented using UIs in a landscape mode.

DETAILED DESCRIPTION

FIG. 1 shows an illustrative environment 100 in which various users 105 employ electronic devices 110 that communicate over a communications network 115. The devices 110 may typically support communications using one or more of text, voice, or video and support data-consuming applications such as Internet browsing and multimedia (e.g., music, video, etc.) consumption in addition to providing various other features. The devices 110 may include, for example, user equipment, mobile phones, cell phones, feature phones, tablet computers, laptops, notebooks, and smartphones which users often employ to make and receive voice and/or multimedia (i.e., video) calls, engage in messaging (e.g., texting) and email communications, use applications such as social applications and access services that employ data, browse the World Wide Web, and the like.

However, alternative types of electronic devices are also envisioned to be usable within the communications environment 100 so long as they are configured with communication capabilities and can connect to the communications network 115. Such alternative electronic devices variously include handheld computing devices; PDAs (personal digital assistants); portable media players; devices that use headsets and earphones (e.g., Bluetooth-compatible devices); phablet devices (i.e., combination smartphone/tablet devices); wearable computers including head mounted display (HMD) devices, bands, watches, and other wearable devices (which may be operatively tethered to other electronic devices in some cases); navigation devices such as GPS (Global Positioning System) systems, laptop PCs (personal computers); multimedia systems; gaming systems; networked or "smart" appliances; or the like. In the discussion that follows, the use of the term "device" is intended to cover all devices that are configured with communication capabilities and are capable of connectivity to the communications network 115.

As shown, the devices 110 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like. The communications network 115 typically includes interfaces that support a connection to the Internet 120 so that the electronic devices 110 can access content provided by one or more content providers 125 and/or service providers 130 in some cases. Accordingly, the communications network 115 is typically enabled to support various types of device-to-device communications including over-the-top communications, and communications that do not utilize conventional telephone numbers in order to provide connectivity between parties.

Accessory devices 114, such as wristbands and other wearable devices may also be present in the environment 100. Such accessory device 114 typically is adapted to interoperate with a device 110 using a short range communication protocol to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can operate on a standalone basis as well, and may expose functionalities having a similar scope to a smartphone in some implementations, or a more restricted set of functionalities in others.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface (UI). Some devices may support video consumption and Internet browsing, while other devices may support more limited media handling and network interface features.

Figure 2:
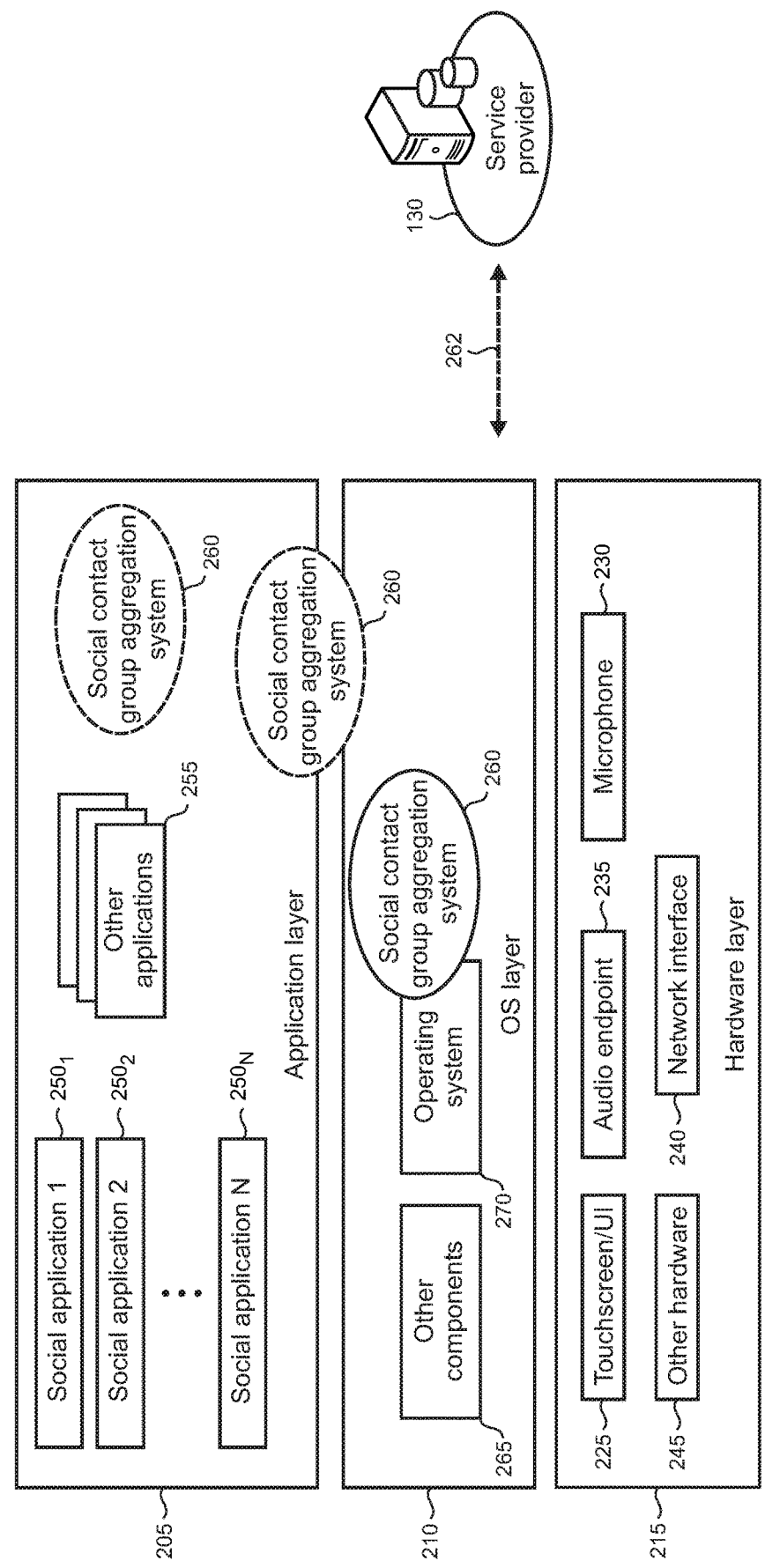
FIG. 2 shows an illustrative layered architecture that includes an application layer, operating system (OS) layer, and hardware layer.

The present automated aggregation of social contact groups may be implemented using components that are instantiated on a given device 110. In some implementations the automated aggregation can also be implemented, in whole or part, using data and/or services supported by a remote service provider (e.g., service provider 130 in FIG. 1). FIG. 2 shows an illustrative layered architecture 200 that supports various applications and other components that may be utilized to support various features, functions, and user experiences. The architecture 200 is typically implemented in software, although combinations of software, firmware, and/or hardware may also be utilized in some cases. The architecture 200 is arranged in layers and includes an application layer 205, an OS (operating system) layer 210, and a hardware layer 215. The hardware layer 215 provides an abstraction of the various hardware used by the device 110 (e.g., input and output devices, networking and radio hardware, etc.) to the layers above it. In this particular illustrative example, the hardware layer supports at least touchscreen 225 or other suitable UI component to support interactions with the user 105 (FIG. 1), a microphone 230, an audio endpoint 235 which may include, for example, a wired or wireless headset/earpiece, speakerphone, external speaker/device, a network interface 240, and various other hardware components 245.

The application layer 205 in this illustrative example supports various different social applications $250_{1, 2 \ldots N}$, as well as other applications 255. The applications are often implemented using locally executing code. However in some cases, these applications may rely on services and/or remote code execution provided by remote servers or other computing platforms such as those supported by the service provider 130 or other cloud-based resources as indicated by line 262. While the applications 250 and 255 are shown here as components that are instantiated in the application layer 205, it may be appreciated that the functionality provided by a given application may be implemented, in whole or part, using components that are supported in either the OS or hardware layers.

The OS layer 210 supports a social contact group aggregation system 260 (which may be a component, for example, of the OS 270) and various other components 265. The operation of the social contact group aggregation system 260 is described in more detail below in the description accompanying FIG. 8. In some cases, social contact group aggregation system 260 can interact with the service provider 130. That is, the social contact group aggregation system 260 in some implementations can partially utilize or fully utilize remote code execution supported at the service provider 130, or using other remote resources. In addition, it may utilize and/or interact with the other components 265 (and/or other components that are instantiated in the other layers of the architecture 200) as may be needed to implement the various features and functions described herein. The social contact group aggregation system 260 may alternatively be instantiated using elements that are instantiated in both the OS and application layers or be configured as an application, as shown in FIG. 2 using the dashed oval elements. It may also be appreciated that the functionality provided by the social contact group aggregation system 260 can be implemented, in whole or part, using components that are supported in any of the layers in the architecture 200.

Figure 3:
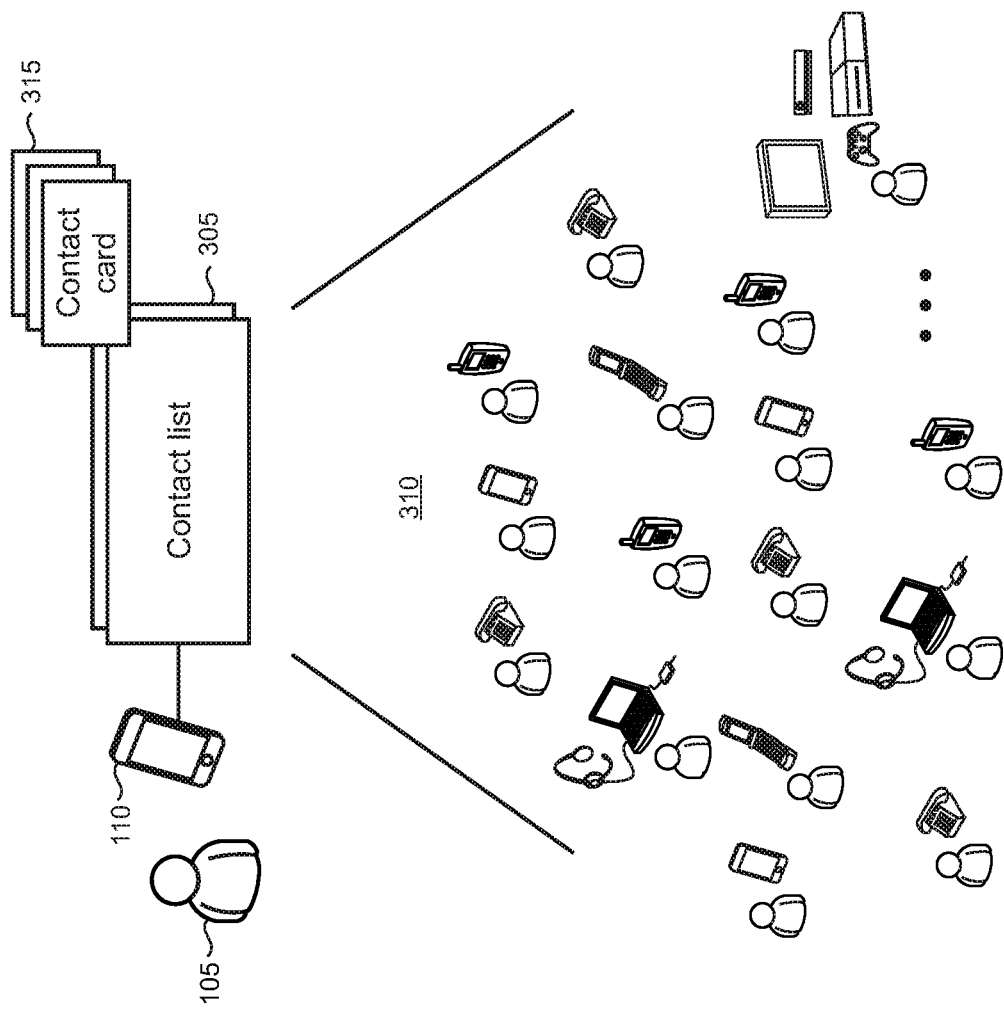
FIG. 3 depicts illustrative social contact lists and contact cards that may be stored and/or displayed on a device.

An illustrative example of a feature supported on an electronic device 110 (FIG. 1) is shown in FIG. 3 in which information about social contacts may be locally stored and/or accessed from one or more remote stores. As shown, a given device 110 may organize social contact information using one or more contact lists 305 that represent information about a group of social contacts 310. Each contact list 305 may comprise a collection of contact cards where each card 315 is used to store information about a particular social contact (or institution, organization, business, etc.) such as name and picture and/or avatar, telephone numbers for mobile, work, home, etc., personal and work email addresses, home and office addresses, websites, significant other's and children's names, birthdays, and the like.

Figure 4:
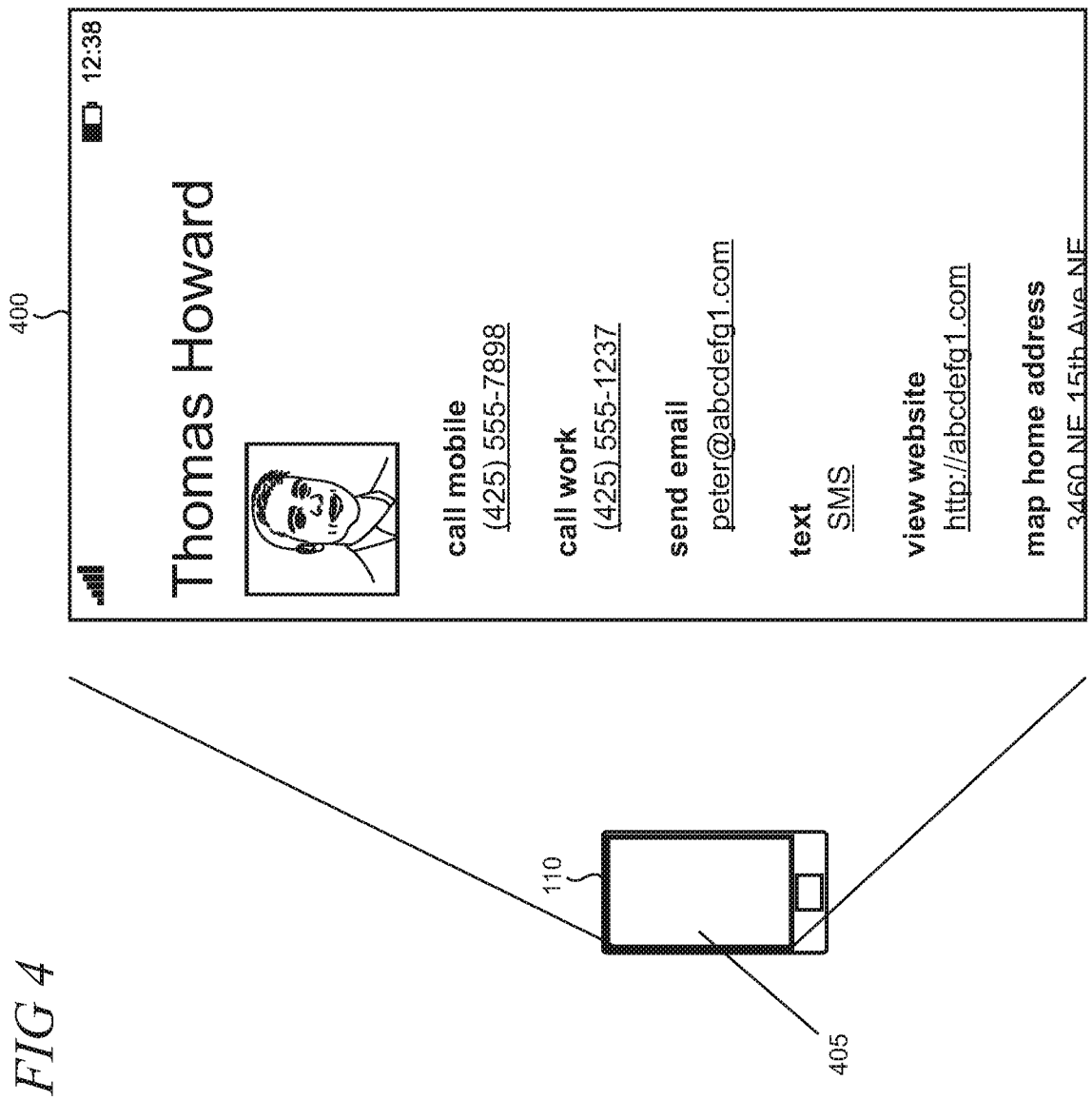
FIG. 4 shows an illustrative user interface (UI) for a social contact card shown on a device.

FIG. 4 shows an illustrative example of a contact card 400 that is typically supported by an email application, contact management application, or other application that may be used to organize social contacts. It is noted that the contact cards shown and described here, and their layout and designs, are intended to be illustrative and that variations in how a contact card is presented, the type and amount of information it contains (typically referred to by the term "profile") that pertains to the social contact, and the ways the user can interact with a contact card can vary from that shown and described in accordance with the needs of a particular implementation of automated aggregation of social contact groups.

In this particular example various kinds of profile information about a contact named "Thomas Howard" is provided on a UI supported on the touchscreen 405 of the device 110. The user 105 (not shown) can interact with the UI in this example by touching links, buttons, icons, graphics, and/or other objects on the screen at appropriate locations to launch various actions from the contact card 400 such as placing a call to a contact's mobile phone, sending him a text or email, etc. Additional information, including links to social application pages and the like, can typically be revealed by using the touchscreen 405 to scroll (e.g., up/down, side-to-side) to other places on the contact card 400. Thus, the contact card 400 may contain collective information about the contact that is more extensive than can be shown at one time on a single UI screen. The additional information that is available but not currently displayed is organized into virtual screens or pages (collectively referred to here as "screens"), where each screen can be loaded for display on the UI in response to the user's scrolling actions. It is noted that the particular scrolling UI with accessible virtual screens shown in the example herein and the user interaction therewith is intended be illustrative and that other UI designs and behaviors may be utilized to meet the needs of a particular implementation of automated aggregation of social contact groups.

Figure 5:
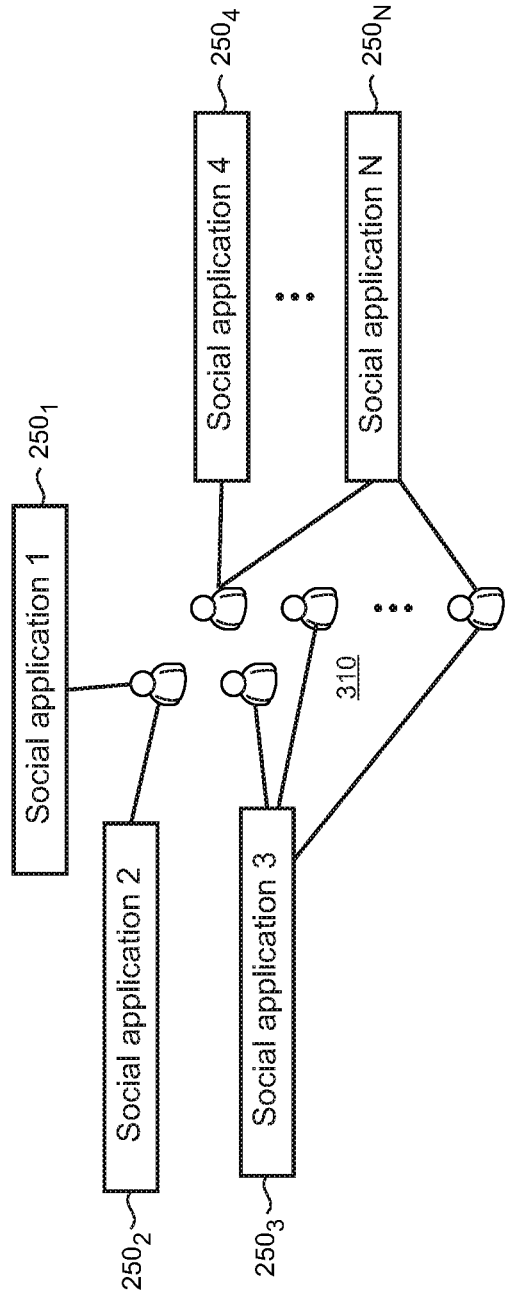
FIG. 5 illustratively shows how social contacts can be associated with multiple social applications that can operate on a device.

Users can often end up with two or more versions of the same social contact on their devices. This situation may result when contact information is maintained for the same person for different social applications, accounts (e.g., email accounts), or profiles. For example, as shown in FIG. 5, some of the user's social contacts 310 can be associated with multiple different social applications 250. A device user can typically interact with the operating system or other suitable functionality to link the multiple versions so that information for a social contact can be rendered in one place, for example on a single contact card. In some cases the linking can be performed in an automated manner, for example by the OS or other suitable functionality, while in other cases, the linking can be performed manually by the user.

Figure 6:
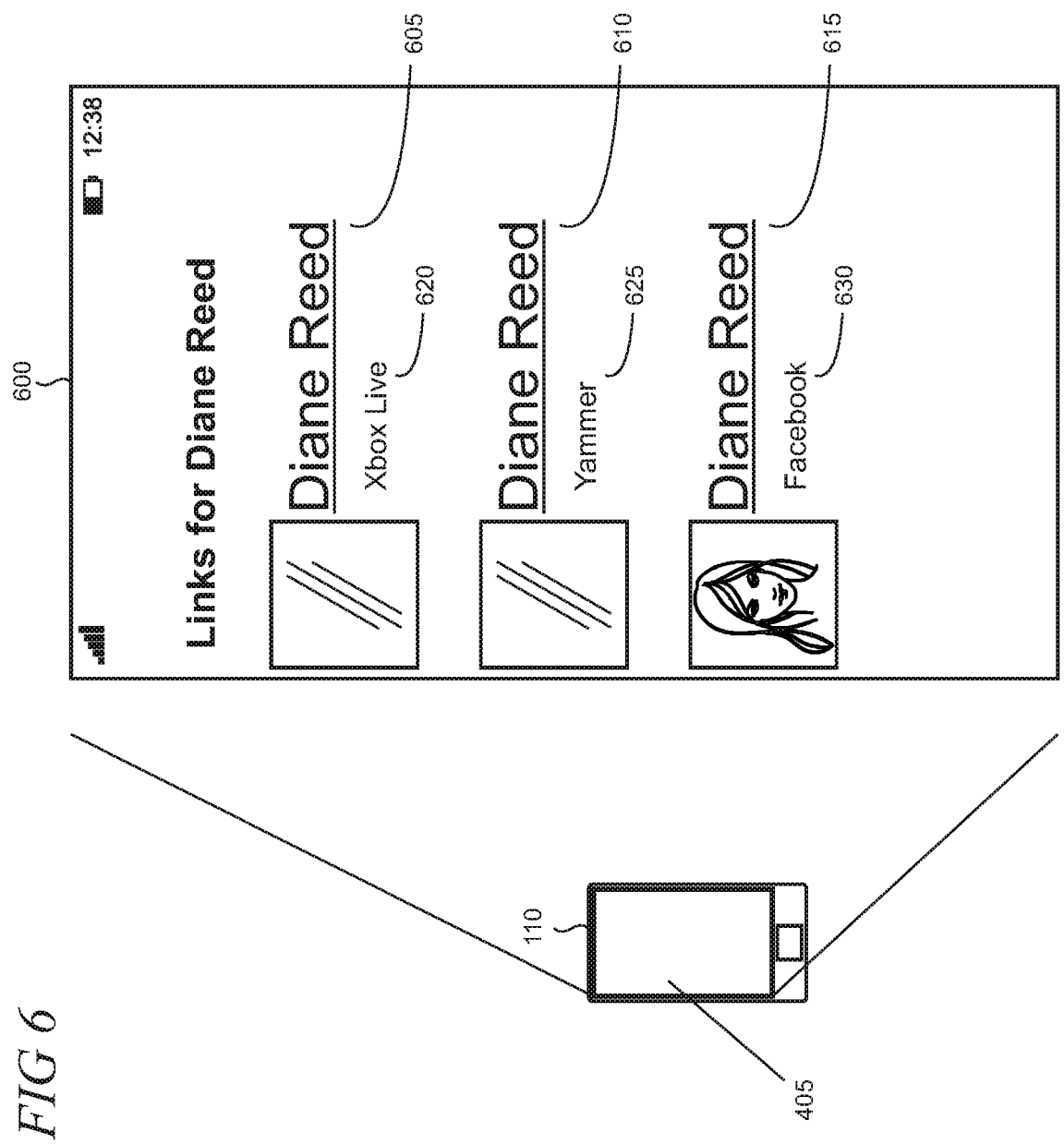
FIG. 6 shows an illustrative UI for a social contact card with linked profiles.

FIG. 6 shows an illustrative example of a contact card 600 displayed on the device touchscreen 405. The contact card includes linked contacts so that all the information for the social contact named "Diane Reed" is displayed in one place. The contact card includes UI elements that can be utilized to launch various actions from the card. In this example, as shown, the contact card includes links 605, 610, and 615 to separate profiles for each of three different social applications 620, 625, and 630.

Figure 7:
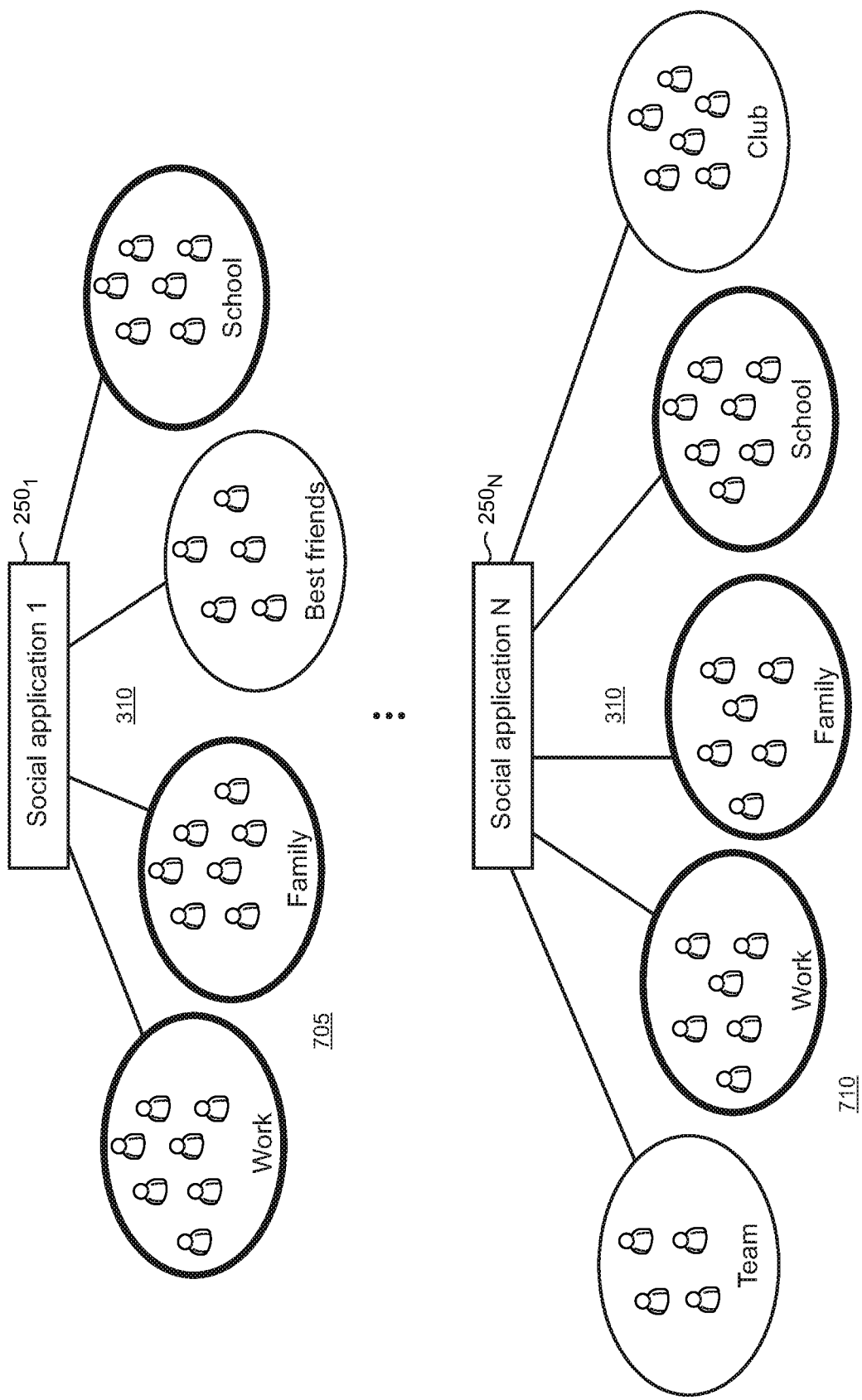
FIG. 7 shows illustrative groups of social contacts that are associated with multiple social applications.

A device user 105 may organize social contacts into various different groups. The same or similar names may be used for groups of social contacts across different social applications 250. For example, as illustratively shown in FIG. 7, the user has organized various ones of the social contacts 310 into groups. One collection of groups (indicated by reference numeral 705) is associated with one social application $250_1$, and another set of groups (indicated by reference numeral 710) is associated with another social application 250N. As shown using the thick-lined ovals in the drawing, the same names are utilized for some groups of the different social applications (i.e., "work", "family", and "school"). Other groups are uniquely named in this example with no overlap between the different social applications 250. Some of the user's social contacts 310 may be associated with more than one social application and be included in groups with the same name. For example, the user's father may utilize multiple social applications and thus be organized into each of the family groups shown in FIG. 7 while the user's mother employs only one of the social applications and is included in just one of the family groups as a result.

Figure 8:
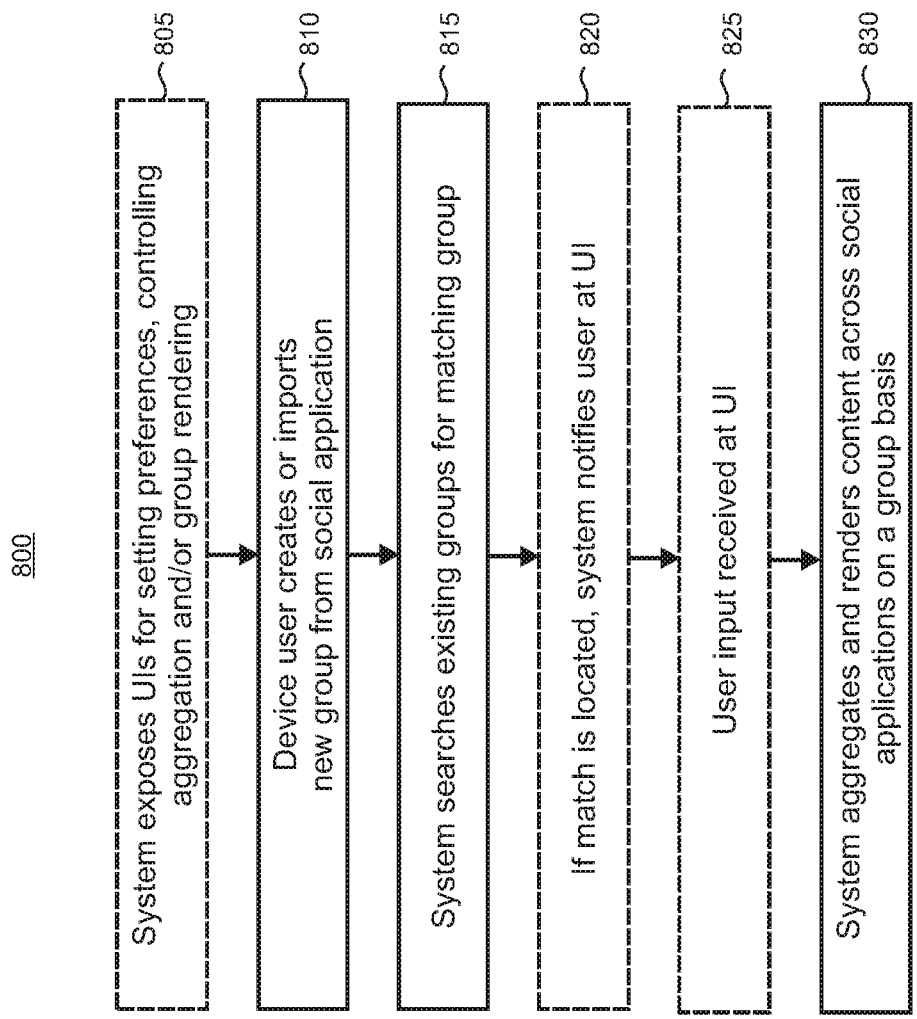
FIG. 8 is a flowchart of an illustrative process for aggregating social contacts.

The user may manually perform the organization of social contacts into groups. The organization of groups may also be facilitated by the social contact group aggregation system 260 (FIG. 2) that operates on a device. FIG. 8 is a flowchart 800 of an illustrative process for automated aggregation of social contacts. Unless specifically stated, the methods or steps shown in the flowcharts contained herein and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 805, the social contact group aggregation system 260 exposes one or more UIs on the device to enable the user to interact with the system in various ways. For example, the UIs may be configured to enable the user to set preferences, control how the aggregation is performed, and control the rendering of the aggregated groups on the device display. The UIs can also be configured to enable the user to respond to various notifications provided by the system (an illustrative example of which is described below). The automated aggregation may begin at step 810 when the device user 105 creates or imports a new group of social contacts from a social application. For example, the user may use an existing one of the social applications 250 (FIG. 2) to create a new group of social contacts, or create a new group when getting started with a new social application.

The aggregation system 260, in step 815, searches for existing groups to match the new group of social contacts. The search is typically performed across all the social applications 250 that are associated with the user, but in some implementations, the system UIs may expose one or more controls that enable the user to specify which social applications and/or groups are included or excluded from the search and/or specify other preferences that control behaviors of the aggregation system. For example, the user may desire to suppress the automated aggregation of social contacts in some cases or limit it to particular applications and/or groups.

Figure 9:
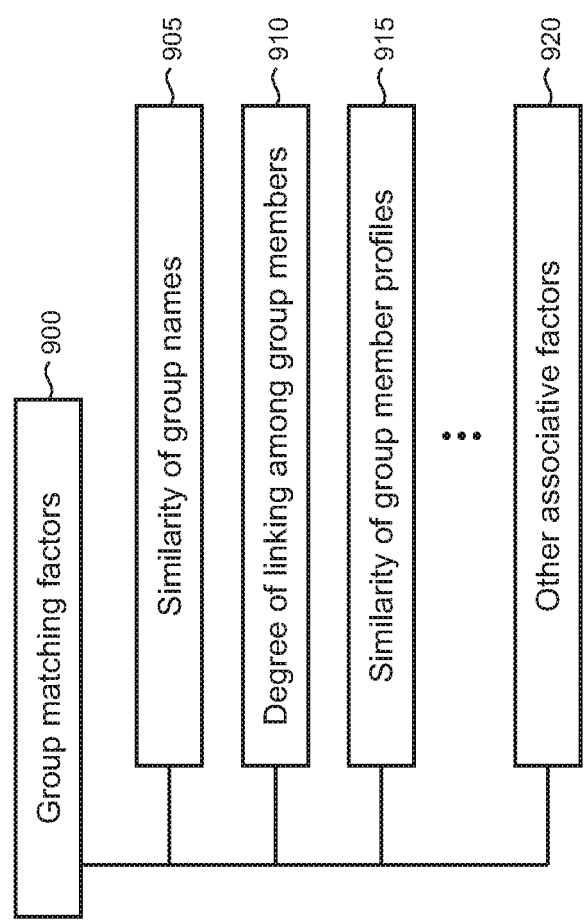
FIG. 9 shows illustrative factors that may be used to match groups of social contacts.

The factors used to determine a match between the new group of social contacts and existing groups can vary by implementation and/or user preferences. FIG. 9 shows a set of illustrative group matching factors 900 that may be used by the social contact group aggregation system 260 to match groups of social contacts. The factors may be used singly or in various combinations and not every factor needs to be utilized in a given implementation. Weighting of factors can also be utilized in some implementations.

Factor 905 considers the similarity between the name of the new group and the name of an existing group. In some cases, the names can be identical, while in other cases some variation in names may be accommodated and still be considered a match. For example, the system may accommodate variations in spelling, singular and plural word forms, and the like when determining if a match exists. In some cases, the system can request assistance from the user in a suitable UI to assist resolving any ambiguity. For example, the system can ask the user if a new group named "football team" is intended by the user to be the same group as "football squad."

Factor 910 takes into account the degree or extent to which social contacts in the new group are already linked (social contact linking is described in the text above accompanying FIG. 6). For example, if many or most of the members in the new group are already linked to members in an existing group, then the system can aggregate the new group to that existing group. The threshold level of linking needed before system performs group aggregation can vary by implementation. In typical cases, if the majority of contacts are already linked, then the system can aggregate the new and existing groups.

In some implementations, if either the group names match (factor 905), or group members are already linked (factor 910), then the process can continue to the next step in the flowchart in FIG. 8. In other implementations, other factors can also be considered by the aggregation system 260 when making a match. Factor 915 considers the similarity of profiles of member contacts in the new group to that of existing groups (contact profiles are discussed above in the text accompanying FIG. 4). For example, if the members in the new group share a common email domain with members in an existing group, then this factor can be used to match the new group to the existing group. Other profile information can also be used such as titles, locations, employer/profession, likes/interests, and the like. Other associative factors (factor 920) may also be utilized depending on the needs of a particular implementation of automated social contact group aggregation.

Returning to the flowchart shown in FIG. 8, the process continues in step 820 with the system notifying the user through the device UI that the new group of social contacts matches existing groups and aggregation is available and/or recommended. In some implementations, step 820 may be optionally skipped in cases, for example, when the user has set a preference to suppress notifications or has set a preference that social contact groups be aggregated automatically, or when aggregation is performed by default on the device without explicit user input.

In step 825, user input may be received at the UI exposed by the system. For example, user input can include various actions to set preferences and control group aggregation features, and respond to system notifications. User behaviors with regard to group aggregation can also be tracked (typically with notice to the user and the user's consent) in some cases so that the aggregation system 260 can predict likely instances when the user would tend to opt in or out of aggregation and perform automated actions responsive to such predictions.

Figure 10:
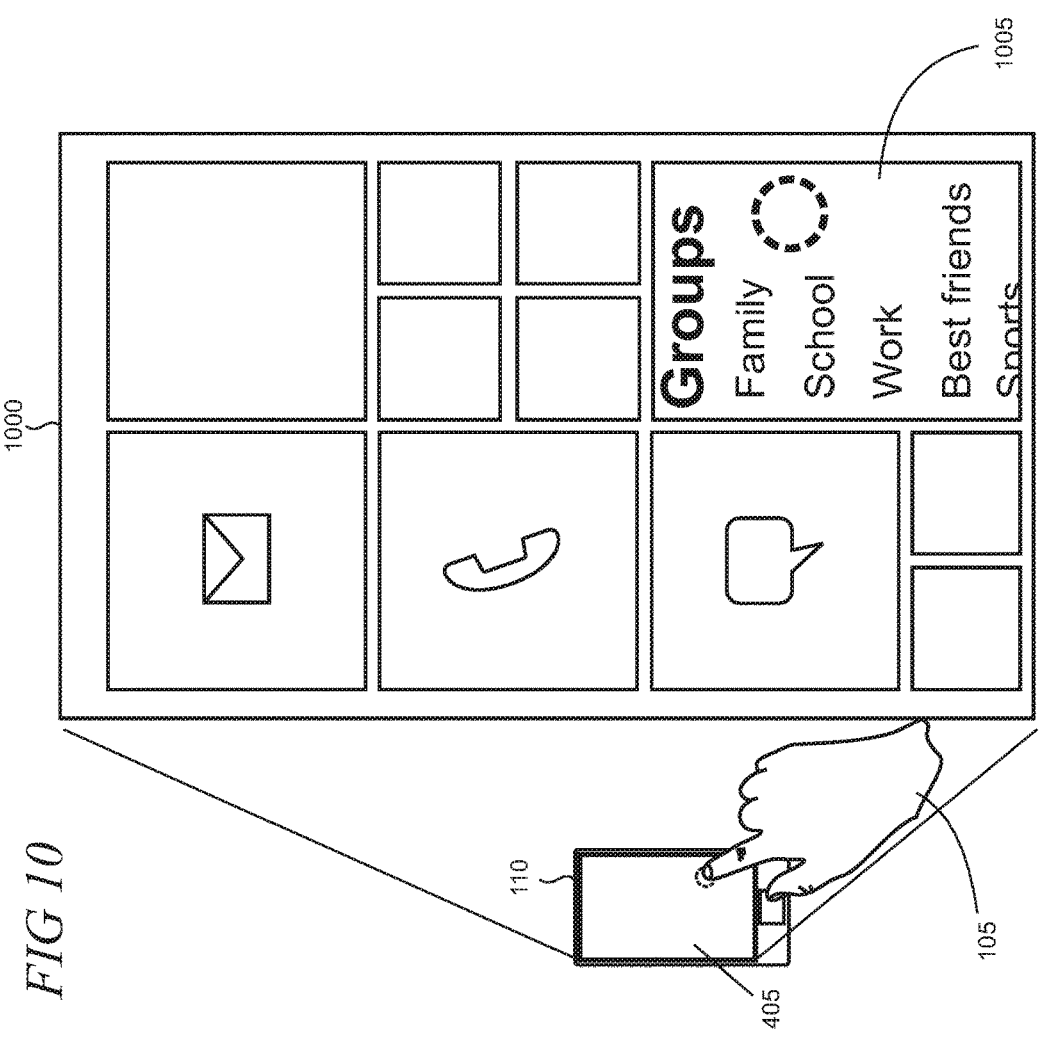
FIG. 10 shows an illustrative UI for a home screen on a device.

In step 830, the system aggregates the groups of social contacts and can render the aggregated groups and associated content in some cases on the display so that the user can keep connected with contacts from different social applications from a single place on the device. In one illustrative example, as shown in the UI 1000 in FIG. 10, the user has interacted with a UI to pin aggregated groups for easy access to a home screen (or similar centralized information location on the device). In this example, a "groups" tile 1005 is displayed as a graphic UI element on the home screen on the touchscreen 405 of a device 110. The tile 1005 shows the various groups that the user has set up, where the groups may include social contacts/content across the social applications 250 (FIG. 2) that are associated with the user 105 and/or the device 110. As noted above, for a given use scenario, some groups may be associated with multiple social applications and others may be associated with unique social applications.

Figure 11:
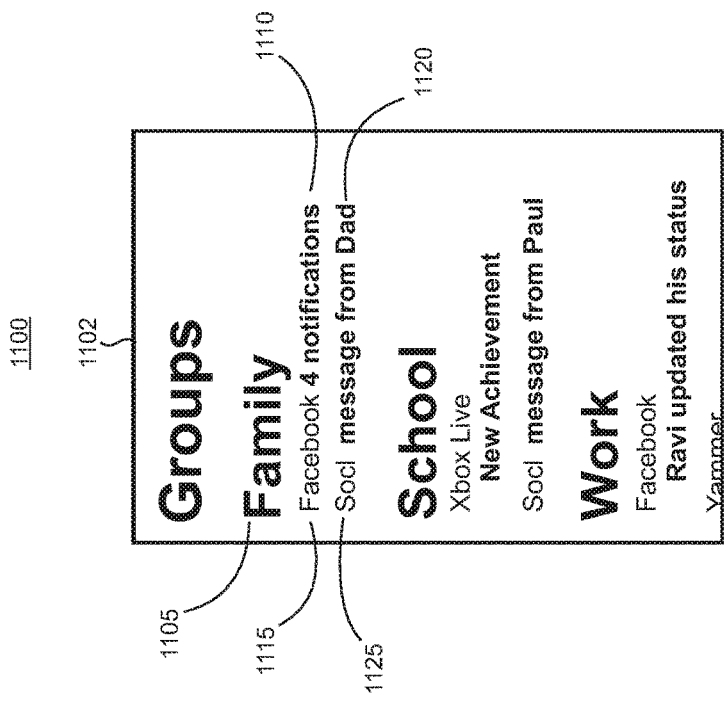
FIG. 11 shows an enlarged view of an illustrative "groups" tile.

In some implementations, a "groups" tile pinned to the home screen may be configured to be dynamically updated (e.g., as a "live" tile) to render content from the aggregated social groups. For example, as shown in enlarged view 1100 in FIG. 11, a "groups" tile 1102 provides a summary of activities associated with different ones of the social applications 250. Thus the aggregated "family" group 1105 shows that the user has new notifications 1110 from a first social application 1115, as well as a new message 1120 from a contact on a second social application 1125. How tile 1102 supports and responds to user interactions can vary by implementation. For example, tile 1102 can be configured to include direct links to the displayed content and/or associated social application. Tile 1102 may also employ a variety of features including text, graphics, animations (e.g., scrolling, panning, flipping), live updates, controls and other UI elements supporting user interactivity, application launches, and the like.

Figure 12:
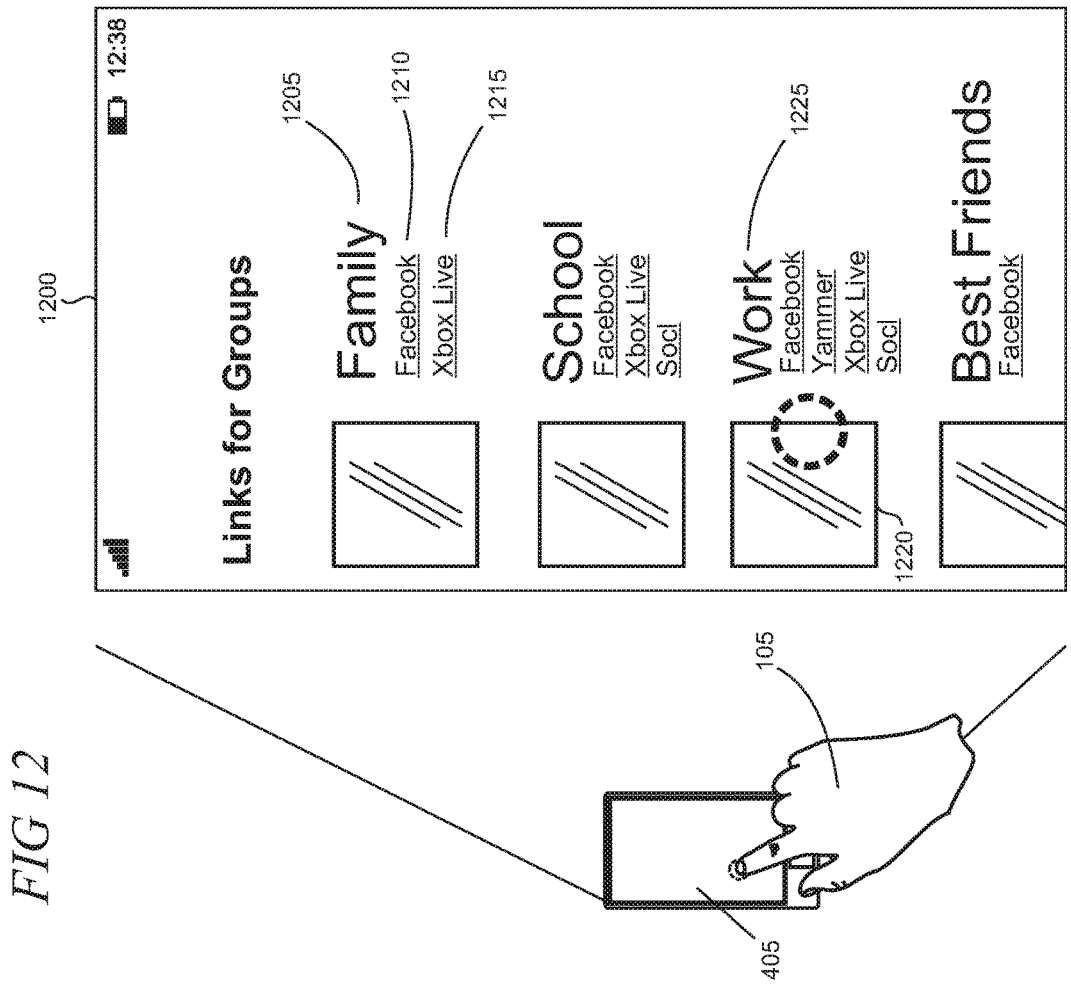
FIG. 12 shows an illustrative UI in which groups of social contacts are aggregated across multiple social applications.

The tile 1102 may be configured as a launch point to user experiences which may vary by implementation. In one illustrative example shown in FIG. 12, the tile may be used to launch a UI 1200 that is rendered on the touchscreen 405 on the device 110 and which aggregates the user's social contact groups in a single place across the social applications, such as a pivot, hub, or other common or central location. The actions used to perform the launch may include physical interaction with the device (such as one or more taps/touches on the touchscreen), observed gestures, voice interactions (e.g., which may include interactions with a digital assistant), or the like. As shown, the UI 1200 includes groups (e.g., "family", "school", "work", "best friends") that are aggregated across social applications. Thus, for example, the "family" group 1205 is aggregated by the system from the social contacts that are members of two different social applications 1210 and 1215.

Figure 13:
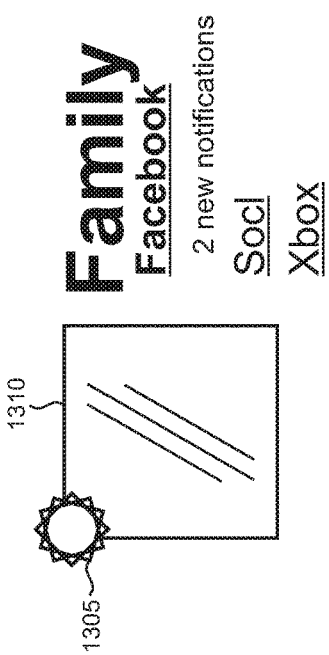
FIGS. 13 and 14 show enlarged views of alternative ways to organize and render a group.
Figure 14:
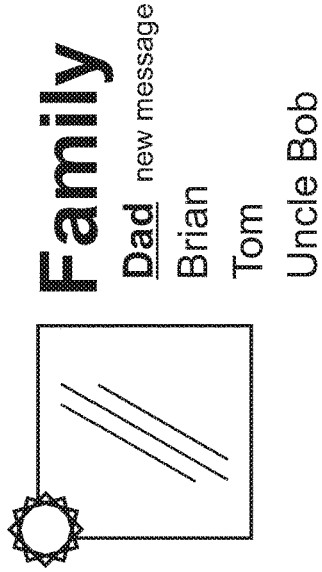

The organization and/or composition of the UI showing the aggregated groups can take a number of alternative forms. For example, FIG. 13 shows an enlarged view 1300 of the "family" group that includes an ornament 1305 or other suitable element (e.g., graphic, glyph, icon) on the avatar 1310 to indicate that there is new content for the group. In this form, the three social applications are explicitly identified on the UI. FIG. 14 shows an enlarged view 1400 of an alternative form in which the groups for multiple social networks are aggregated, but the social applications are not explicitly identified. Instead, the form includes the social contacts in the aggregated group.

Figure 15:
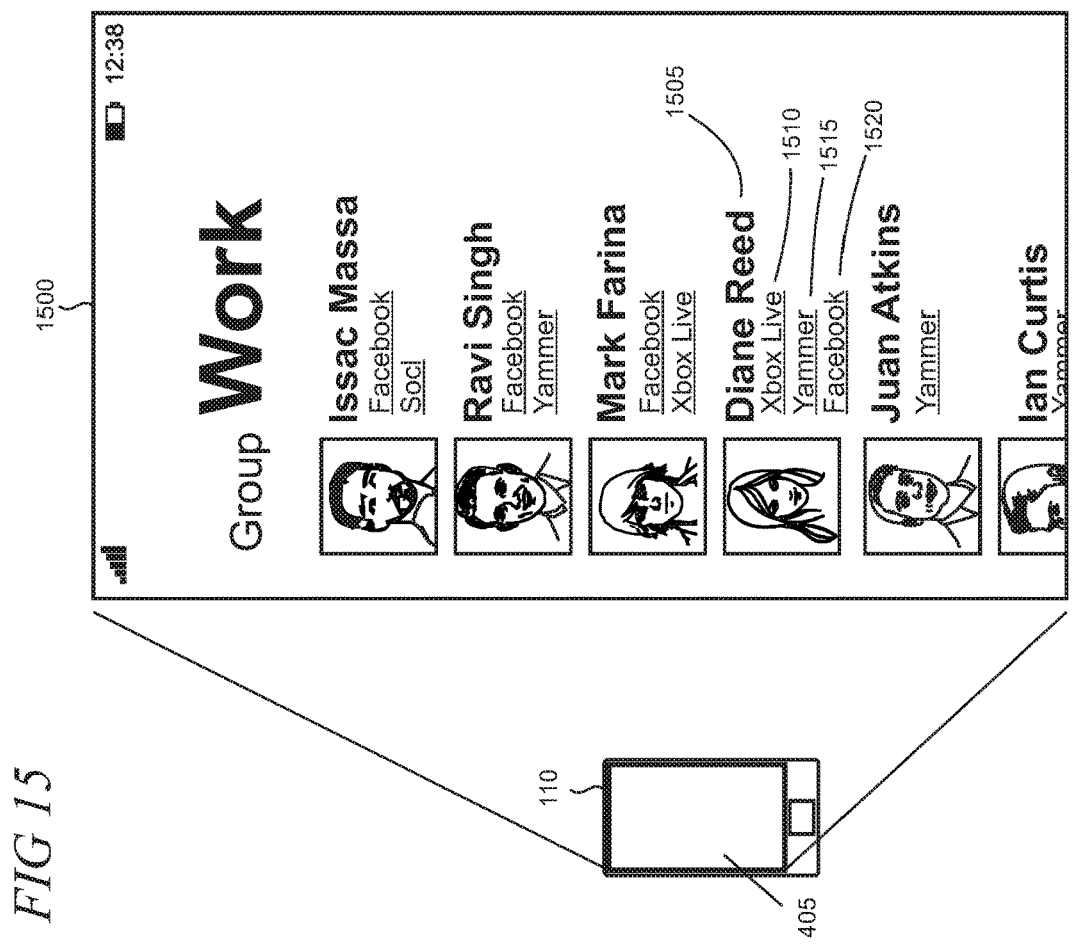
FIG. 15 depicts an illustrative UI that shows social contacts from a group that is shared across multiple social applications.

Returning to FIG. 12, the user may launch additional user experiences from the aggregated groups UI 1200 as may suit the needs of a particular application. In an illustrative example, the user 105 interacts with the "work" group icon 1220 (or alternatively the link 1225) using the touchscreen 405 which launches the UI 1500 shown in FIG. 15. The UI 1500 includes links to social contacts and each of the social applications to which the contacts are associated. Some of the social contacts are associated with multiple social applications, as shown. For example, the social contact "Diane Reed" 1505 is associated with links to three different social applications 1510, 1515, and 1520. As noted above in the illustrative example accompanying FIG. 6, this particular social contact also has her profiles for the different social applications linked on her contact card (i.e., element 600 in FIG. 6).

Figure 16:
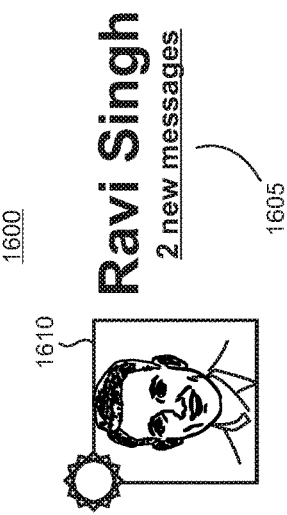
FIGS. 16 and 17 show enlarged views of alternative ways to organize and render social contacts in an aggregated group.
Figure 17:
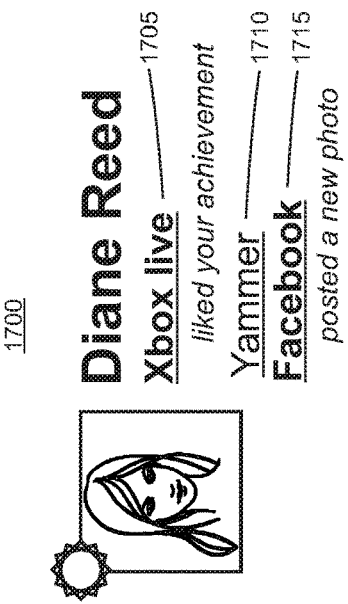

The organization and/or composition of the UI showing the links for an aggregated group can take a number of alternative forms as may suit the needs of a particular application. For example, FIG. 16 shows an enlarged view 1600 of a social contact in the "work" group in which content 1605 is displayed next to the contact's avatar 1610, but the particular social applications to which the contact is associated are not explicitly identified. FIG. 17 shows an enlarged view 1700 of another alternative form in which different social applications 1705, 1710, and 1715 are explicitly identified for a social contact and content from the applications is also displayed.

Figure 18:
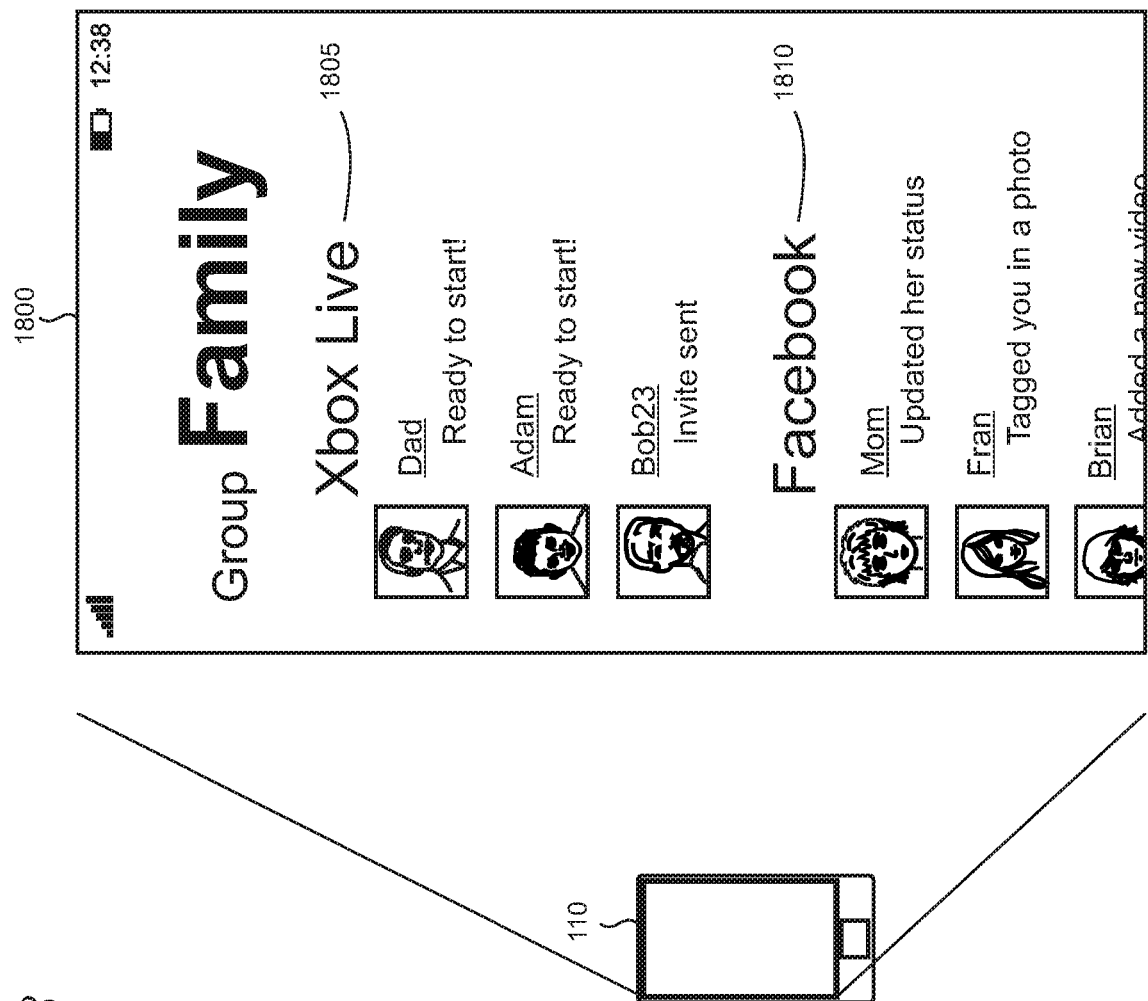
FIG. 18 depicts an illustrative UI that shows social contacts from a group that is shared across multiple social applications.

FIG. 18 shows alternative illustrative UI 1800 in which a "family" group is aggregated from groups of social applications 1805 and 1810. In this particular UI, the social contacts in the group are sorted by social application. The above illustrative UI examples show that there are various ways to organize and render the aggregated groups. It may be further appreciated that an organizational form can be adapted to the particular needs of a given implementation and thus vary from what is shown herein.

Figure 19:
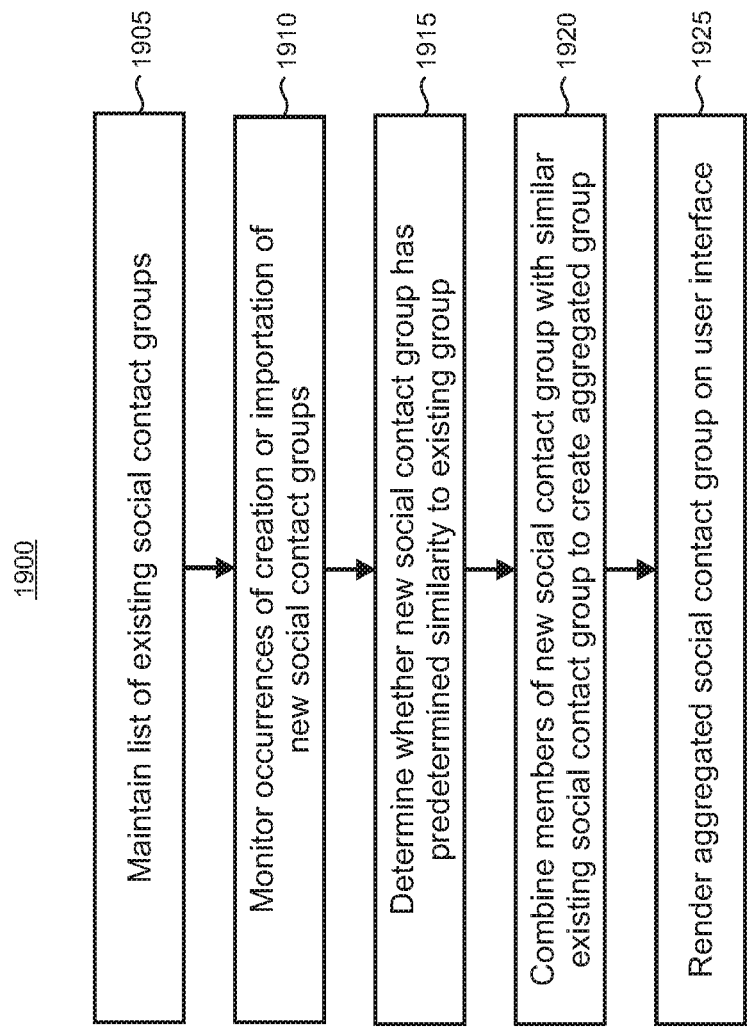
FIGS. 19, 20, and 21 are flowcharts of illustrative processes that may be performed on an electronic device.

FIG. 19 is a flowchart that depicts an illustrative process 1900 that may be performed on an electronic device such as a PC, tablet, multimedia console, or smartphone. The process starts at block 1905 in which a list of existing social contact groups that are available to the device is maintained. The social contact groups can be associated with various social applications and the groups and/or social applications can be instantiated locally on the device and/or be partially or fully instantiated on remote systems. At block 1910, occurrences of creation or importation of new social contact groups are monitored.

At block 1915, the process continues with detecting whether a new social contact group has a predetermined similarity to an existing social contact group. The predetermined similarity may be based on social contact group name or linking of members between the new and existing social contact groups. At block 1920, in response to the detecting, members of the new social contact group are combined with the similar existing social contact group to create an aggregated social contact group. At block 1925, the aggregated social contact group is rendered on a UI supported by the device.

Figure 20:
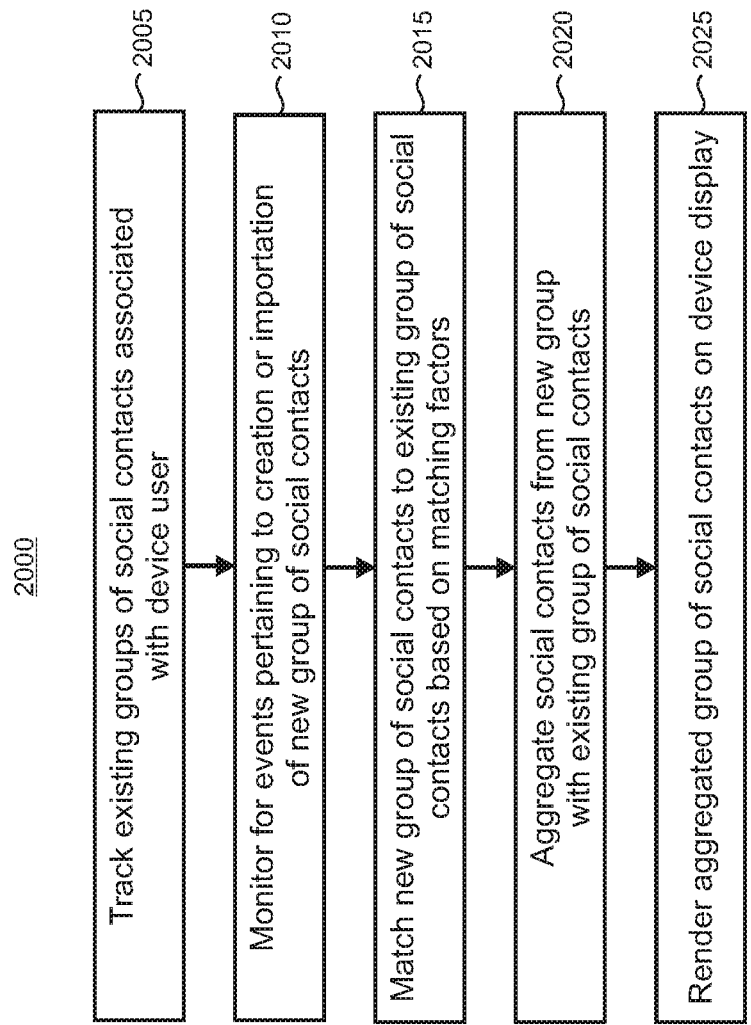

FIG. 20 is a flowchart that depicts an illustrative process 2000 that may be performed on an electronic device such as a PC, tablet, multimedia console, or smartphone. The process starts at block 2005 in which existing social contact groups associated with a user of the device are tracked. At block 2010, monitoring is performed for events pertaining to the creation or importation of a new group of social contacts. At block 2015, the new group of social contacts is matched with an existing group based on matching factors. At block 2020, social contacts in the new group are aggregated with the matching existing group. At block 2025, the aggregated group of social contacts is rendered on the device display.

Figure 21:
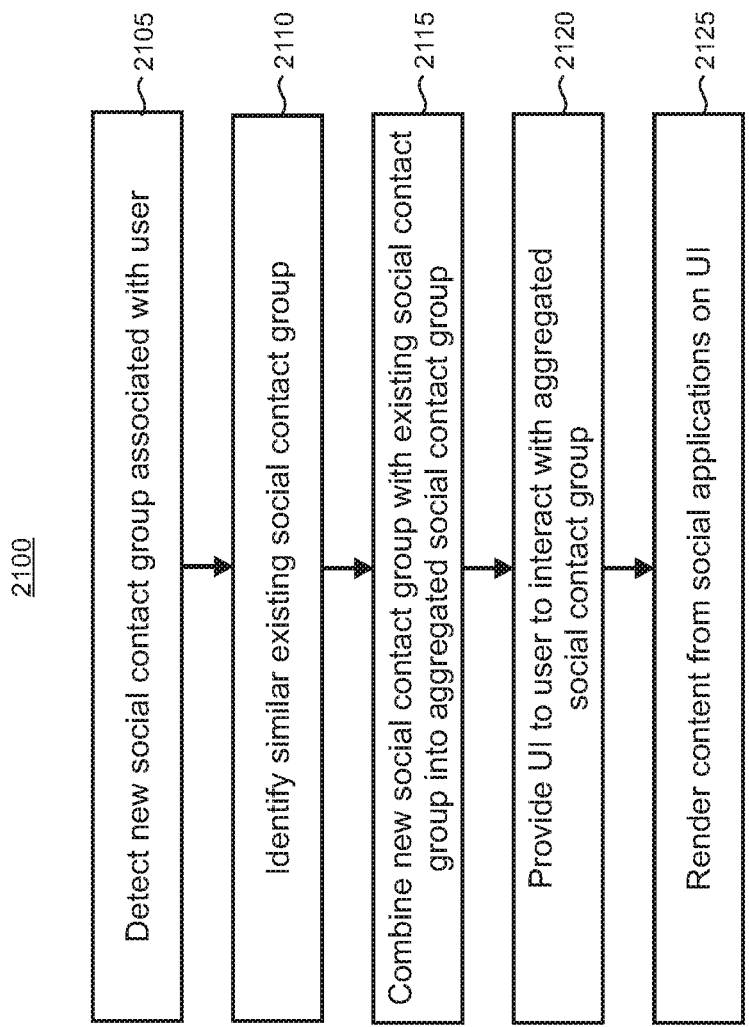

FIG. 21 is a flowchart that depicts an illustrative process 2100 that may be performed on an electronic device such as a PC, tablet, multimedia console, or smartphone. The process starts at block 2105 in which a new social contact group associated with a device user is detected. At block 2110, an existing social contact group that is similar to the new group is identified. At block 2115, the new social contact group is combined with the identified existing group into an aggregated social contract group. A UI that enables the user to interact with the aggregated social contact group is provided at block 2120. Content from social applications is rendered on the UI at block 2125.

Figure 22:
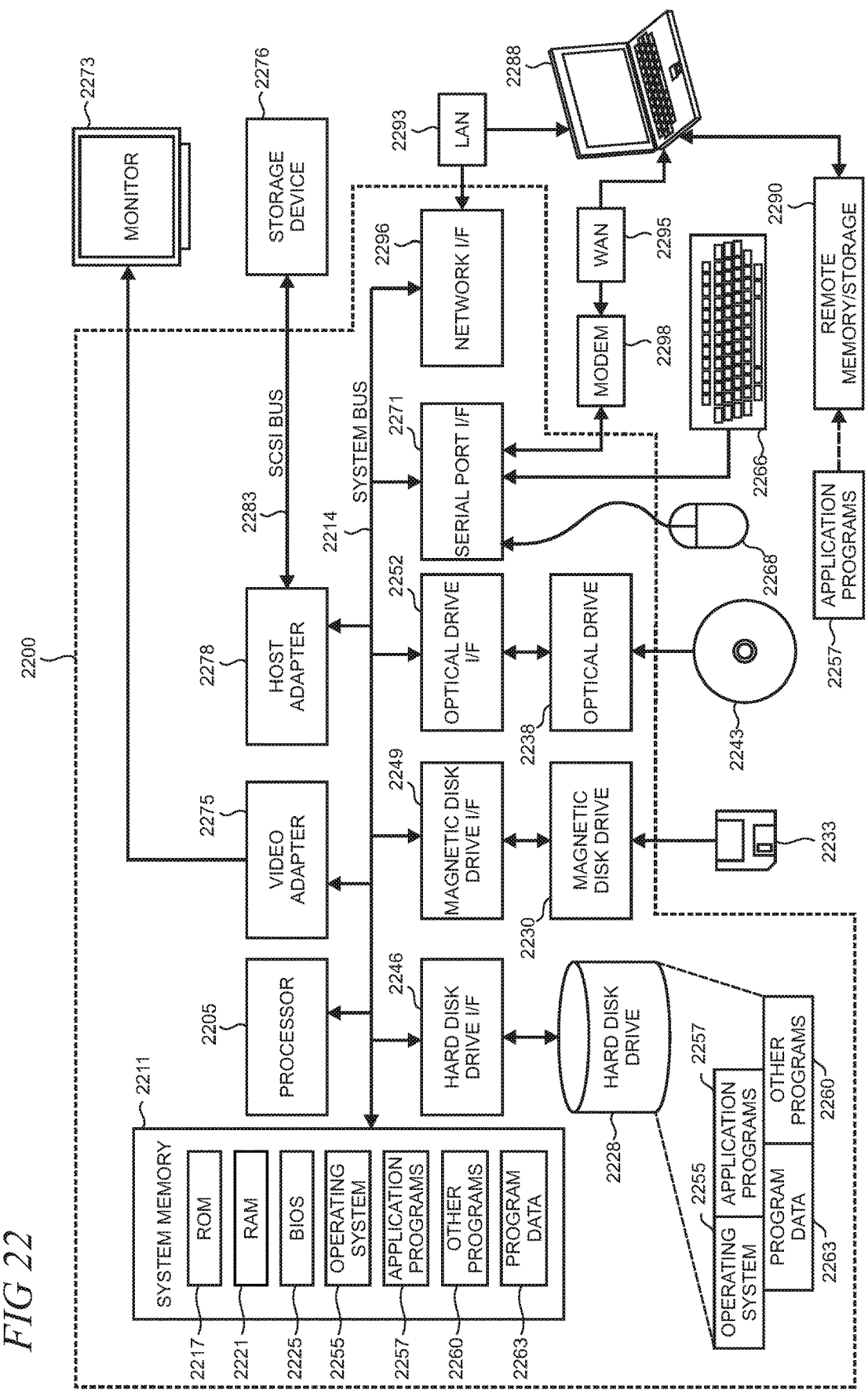
FIG. 22 is a simplified block diagram of an illustrative computer system such as a personal computer (PC) that may be used to implement the present automated aggregation of social contact groups.

FIG. 22 is a simplified block diagram of an illustrative computer system 2200 such as a personal computer (PC), client machine, or server with which the present automated aggregation of social contact groups may be implemented in some applications. Computer system 2200 includes a processor 2205, a system memory 2211, and a system bus 2214 that couples various system components including the system memory 2211 to the processor 2205. The system bus 2214 may be any of several types of bus structures including a memory bus or memory controller, a peripheral bus, or a local bus using any of a variety of bus architectures. The system memory 2211 includes read only memory (ROM) 2217 and random access memory (RAM) 2221. A basic input/output system (BIOS) 2225, containing the basic routines that help to transfer information between elements within the computer system 2200, such as during startup, is stored in ROM 2217. The computer system 2200 may further include a hard disk drive 2228 for reading from and writing to an internally disposed hard disk (not shown), a magnetic disk drive 2230 for reading from or writing to a removable magnetic disk 2233 (e.g., a floppy disk), and an optical disk drive 2238 for reading from or writing to a removable optical disk 2243 such as a CD (compact disc), DVD (digital versatile disc), or other optical media. The hard disk drive 2228, magnetic disk drive 2230, and optical disk drive 2238 are connected to the system bus 2214 by a hard disk drive interface 2246, a magnetic disk drive interface 2249, and an optical drive interface 2252, respectively. The drives and their associated computer-readable storage media provide non-volatile storage of computer-readable instructions, data structures, program modules, and other data for the computer system 2200. Although this illustrative example includes a hard disk, a removable magnetic disk 2233, and a removable optical disk 2243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automated aggregation of social contact groups. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 2228, magnetic disk 2233, optical disk 2243, ROM 2217, or RAM 2221, including an operating system 2255, one or more application programs 2257, other program modules 2260, and program data 2263. A user may enter commands and information into the computer system 2200 through input devices such as a keyboard 2266 and pointing device 2268 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2205 through a serial port interface 2271 that is coupled to the system bus 2214, but may be connected by other interfaces, such as a parallel port, game port, or universal serial bus (USB). A monitor 2273 or other type of display device is also connected to the system bus 2214 via an interface, such as a video adapter 2275. In addition to the monitor 2273, personal computers typically include other peripheral output devices (not shown), such as speakers and printers. The illustrative example shown in FIG. 22 also includes a host adapter 2278, a Small Computer System Interface (SCSI) bus 2283, and an external storage device 2276 connected to the SCSI bus 2283.

The computer system 2200 is operable in a networked environment using logical connections to one or more remote computers, such as a remote computer 2288. The remote computer 2288 may be selected as another personal computer, a server, a router, a network PC, a peer device, or other common network node, and typically includes many or all of the elements described above relative to the computer system 2200, although only a single representative remote memory/storage device 2290 is shown in FIG. 22. The logical connections depicted in FIG. 22 include a local area network (LAN) 2293 and a wide area network (WAN) 2295. Such networking environments are often deployed, for example, in offices, enterprise-wide computer networks, intranets, and the Internet.

When used in a LAN networking environment, the computer system 2200 is connected to the local area network 2293 through a network interface or adapter 2296. When used in a WAN networking environment, the computer system 2200 typically includes a broadband modem 2298, network gateway, or other means for establishing communications over the wide area network 2295, such as the Internet. The broadband modem 2298, which may be internal or external, is connected to the system bus 2214 via a serial port interface 2271. In a networked environment, program modules related to the computer system 2200, or portions thereof, may be stored in the remote memory storage device 2290. It is noted that the network connections shown in FIG. 22 are illustrative and other means of establishing a communications link between the computers may be used depending on the specific requirements of an application of the present automated aggregation of social contact groups.

Figure 23:
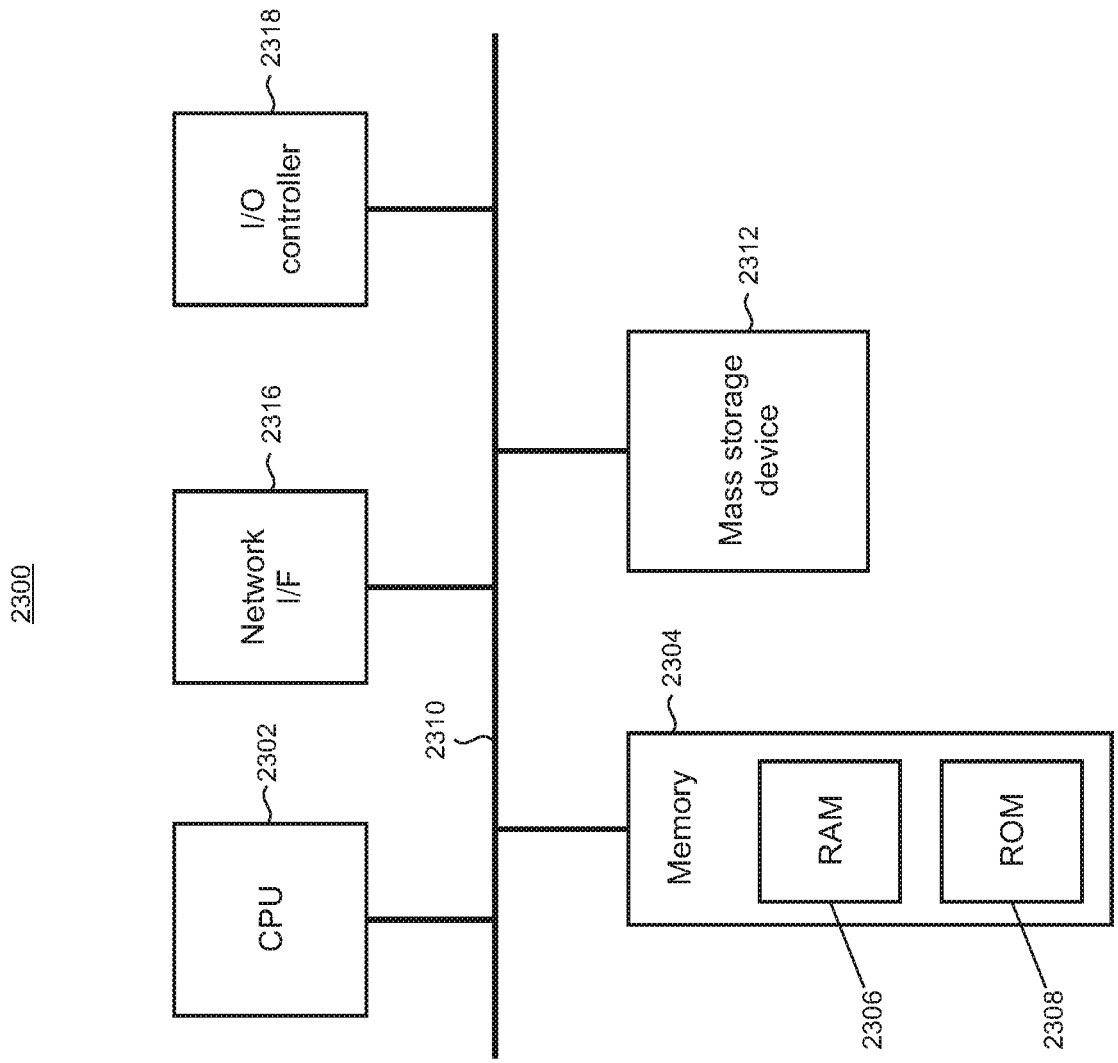
FIG. 23 shows a block diagram of an illustrative device that may be used in part to implement the present automated aggregation of social contact groups.

FIG. 23 shows an illustrative architecture 2300 for a device capable of executing the various components described herein for providing the present automated aggregation of social contact groups. Thus, the architecture 2300 illustrated in FIG. 23 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2300 may be utilized to execute any aspect of the components presented herein.

The architecture 2300 illustrated in FIG. 23 includes a CPU 2302, a system memory 2304, including a RAM 2306 and a ROM 2308, and a system bus 2310 that couples the memory 2304 to the CPU 2302. A basic input/output system containing the basic routines that help to transfer information between elements within the architecture 2300, such as during startup, is stored in the ROM 2308. The architecture 2300 further includes a mass storage device 2312 for storing software code or other computer-executed code that is utilized to implement applications, the file system, and the operating system.

The mass storage device 2312 is connected to the CPU 2302 through a mass storage controller (not shown) connected to the bus 2310. The mass storage device 2312 and its associated computer-readable storage media provide non-volatile storage for the architecture 2300.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It should be appreciated that the network interface unit 2316 also may be utilized to connect to other types of networks and remote computer systems. The architecture 2300 also may include an input/output controller 2318 for receiving and processing input from a number of other devices, including a keyboard, mouse, or electronic stylus (not shown in FIG. 23). Similarly, the input/output controller 2318 may provide output to a display screen, a printer, or other type of output device (also not shown in FIG. 23).

It should be appreciated that the software components described herein may, when loaded into the CPU 2302 and executed, transform the CPU 2302 and the overall architecture 2300 from a general-purpose computing system into a special-purpose computing system customized to facilitate the functionality presented herein. The CPU 2302 may be constructed from any number of transistors or other discrete circuit elements, which may individually or collectively assume any number of states. More specifically, the CPU 2302 may operate as a finite-state machine, in response to executable instructions contained within the software modules disclosed herein. These computer-executable instructions may transform the CPU 2302 by specifying how the CPU 2302 transitions between states, thereby transforming the transistors or other discrete hardware elements constituting the CPU 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2300 in order to store and execute the software components presented herein. It also should be appreciated that the architecture 2300 may include other types of computing devices, including handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
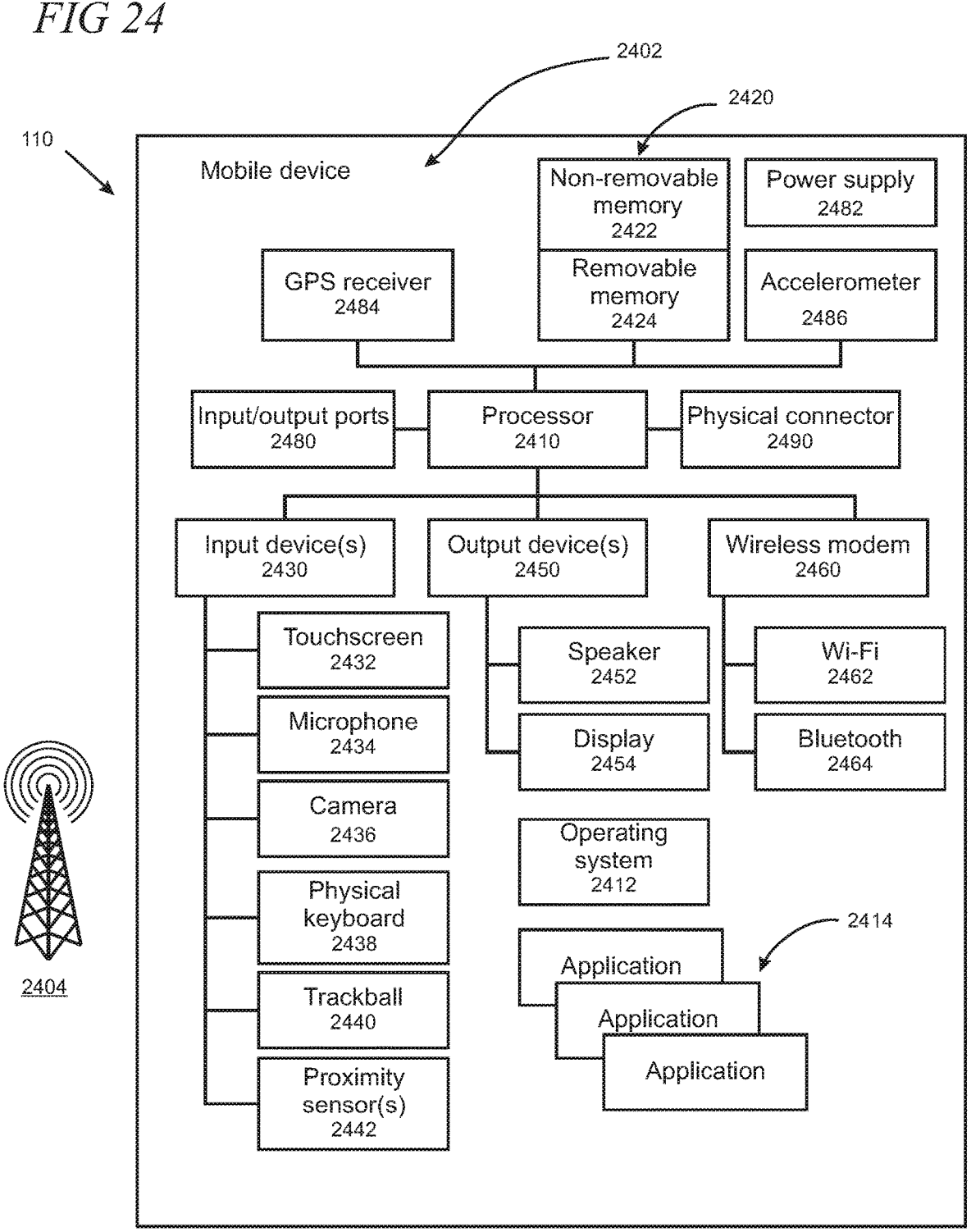
FIG. 24 is a block diagram of an illustrative mobile device.

FIG. 24 is a functional block diagram of an illustrative device 110 such as a mobile phone or smartphone including a variety of optional hardware and software components, shown generally at 2402. Any component 2402 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 2404, such as a cellular or satellite network.

The illustrated mobile device 110 can include a controller or processor 2410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2412 can control the allocation and usage of the components 2402, including power states, above-lock states, and below-lock states, and provides support for one or more application programs 2414. The application programs can include common mobile computing applications (e.g., image-capture applications, email applications, calendars, contact managers, web browsers, messaging applications), or any other computing application.

The illustrated mobile device 110 can include memory 2420. Memory 2420 can include non-removable memory 2422 and/or removable memory 2424. The non-removable memory 2422 can include RAM, ROM, Flash memory, a hard disk, or other well-known memory storage technologies. The removable memory 2424 can include Flash memory or a Subscriber Identity Module (SIM) card, which is well known in GSM (Global System for Mobile communications) systems, or other well-known memory storage technologies, such as "smart cards." The memory 2420 can be used for storing data and/or code for running the operating system 2412 and the application programs 2414. Example data can include web pages, text, images, sound files, video data, or other data sets to be sent to and/or received from one or more network servers or other devices via one or more wired or wireless networks.

The memory 2420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2430; such as a touch screen 2432; microphone 2434 for implementation of voice input for voice recognition, voice commands and the like; camera 2436; physical keyboard 2438; trackball 2440; and/or proximity sensor 2442; and one or more output devices 2450, such as a speaker 2452 and one or more displays 2454. Other input devices (not shown) using gesture recognition may also be utilized in some cases. Other possible output devices (not shown) can include piezoelectric or haptic output devices. Some devices can serve more than one input/output function. For example, touchscreen 2432 and display 2454 can be combined into a single input/output device.

A wireless modem 2460 can be coupled to an antenna (not shown) and can support two-way communications between the processor 2410 and external devices, as is well understood in the art. The modem 2460 is shown generically and can include a cellular modem for communicating with the mobile communication network 2404 and/or other radio-based modems (e.g., Bluetooth 2464 or Wi-Fi 2462). The wireless modem 2460 is typically configured for communication with one or more cellular networks, such as a GSM network for data and voice communications within a single cellular network, between cellular networks, or between the mobile device and a public switched telephone network (PSTN).

The mobile device can further include at least one input/output port 2480, a power supply 2482, a satellite navigation system receiver 2484, such as a Global Positioning System (GPS) receiver, an accelerometer 2486, a gyroscope (not shown), and/or a physical connector 2490, which can be a USB port, IEEE 1394 (FireWire) port, and/or an RS-232 port. The illustrated components 2402 are not required or all-inclusive, as any component can be deleted and other components can be added.

Figure 25:
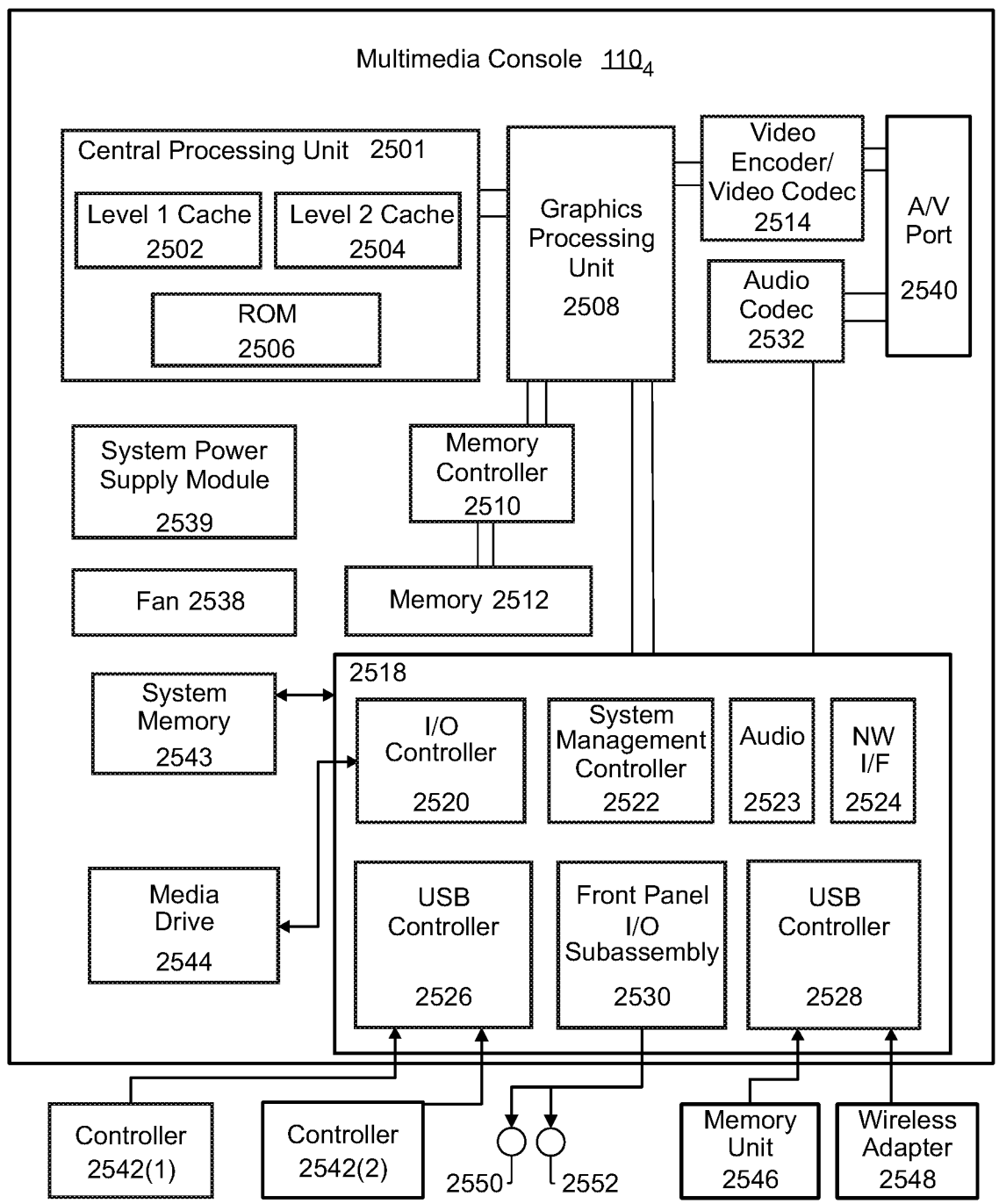
FIG. 25 is a block diagram of an illustrative multimedia console.

FIG. 25 is an illustrative functional block diagram of a multimedia console 1104. The multimedia console has a central processing unit (CPU) 2501 having a level 1 cache 2502, a level 2 cache 2504, and a Flash ROM (Read Only Memory) 2506. The level 1 cache 2502 and the level 2 cache 2504 temporarily store data and hence reduce the number of memory access cycles, thereby improving processing speed and throughput. The CPU 2501 may be configured with more than one core, and thus, additional level 1 and level 2 caches 2502 and 2504. The Flash ROM 2506 may store executable code that is loaded during an initial phase of a boot process when the multimedia console is powered ON.

A graphics processing unit (GPU) 2508 and a video encoder/video codec (coder/decoder) 2514 form a video processing pipeline for high speed and high resolution graphics processing. Data is carried from the GPU 2508 to the video encoder/video codec 2514 via a bus. The video processing pipeline outputs data to an A/V (audio/video) port 2540 for transmission to a television or other display. A memory controller 2510 is connected to the GPU 2508 to facilitate processor access to various types of memory 2512, such as, but not limited to, RAM.

The multimedia console includes an I/O controller 2520, a system management controller 2522, an audio processing unit 2523, a network interface controller 2524, a first USB host controller 2526, a second USB controller 2528, and a front panel I/O subassembly 2530 that are preferably implemented on a module 2518. The USB controllers 2526 and 2528 serve as hosts for peripheral controllers 2542(1)-2542(2), a wireless adapter 2548, and an external memory device 2546 (e.g., Flash memory, external CD/DVD ROM drive, removable media, etc.). The network interface controller 2524 and/or wireless adapter 2548 provide access to a network (e.g., the Internet, home network, etc.) and may be any of a wide variety of various wired or wireless adapter components including an Ethernet card, a modem, a Bluetooth module, a cable modem, and the like.

System memory 2543 is provided to store application data that is loaded during the boot process. A media drive 2544 is provided and may comprise a DVD/CD drive, hard drive, or other removable media drive, etc. The media drive 2544 may be internal or external to the multimedia console. Application data may be accessed via the media drive 2544 for execution, playback, etc. by the multimedia console. The media drive 2544 is connected to the I/O controller 2520 via a bus, such as a Serial ATA bus or other high speed connection (e.g., IEEE 1394).

The system management controller 2522 provides a variety of service functions related to assuring availability of the multimedia console. The audio processing unit 2523 and an audio codec 2532 form a corresponding audio processing pipeline with high fidelity and stereo processing. Audio data is carried between the audio processing unit 2523 and the audio codec 2532 via a communication link. The audio processing pipeline outputs data to the A/V port 2540 for reproduction by an external audio player or device having audio capabilities.

The front panel I/O subassembly 2530 supports the functionality of the power button 2550 and the eject button 2552, as well as any LEDs (light emitting diodes) or other indicators exposed on the outer surface of the multimedia console. A system power supply module 2536 provides power to the components of the multimedia console. A fan 2538 cools the circuitry within the multimedia console.

The CPU 2501, GPU 2508, memory controller 2510, and various other components within the multimedia console are interconnected via one or more buses, including serial and parallel buses, a memory bus, a peripheral bus, and a processor or local bus using any of a variety of bus architectures. By way of example, such architectures can include a Peripheral Component Interconnects ("PCI") bus, PCI-Express bus, etc.

When the multimedia console is powered ON, application data may be loaded from the system memory 2543 into memory 2512 and/or caches 2502 and 2504 and executed on the CPU 2501. The application may present a graphical user interface that provides a consistent user experience when navigating to different media types available on the multimedia console. In operation, applications and/or other media contained within the media drive 2544 may be launched or played from the media drive 2544 to provide additional functionalities to the multimedia console.

The multimedia console may be operated as a standalone system by simply connecting the system to a television or other display. In this standalone mode, the multimedia console allows one or more users to interact with the system, watch movies, or listen to music. However, with the integration of broadband connectivity made available through the network interface controller 2524 or the wireless adapter 2548, the multimedia console may further be operated as a participant in a larger network community.

When the multimedia console is powered ON a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's point of view.

In particular, the memory reservation is preferably large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size, and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2542(1) and 2542(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. One or more optical sensors may also define additional input devices for the multimedia console.

Various exemplary embodiments of the present automated aggregation of social contact groups are now presented by way of illustration and not as an exhaustive list of all embodiments. An example includes a method for aggregating social contact groups associated with a plurality of social applications available to an electronic device, in which each social contact group has social contact members, comprising: maintaining a list of existing social contact groups available to the electronic device; monitoring occurrences of creation or importation of new social contact groups; determining whether a new social contact group has a predetermined similarity to an existing social contact group; responsively to the detecting, combining members from the new social contact group and the matching existing social contact group into an aggregated social contact group; and rendering the aggregated social contact group on a user interface (UI) supported by the electronic device.

In another example, the method further includes enabling a user of the electronic device to interact with the rendered aggregated social contact group through the UI. In another example, the predetermined similarity is based on social contact group name. In another example, the predetermined similarity is based on linking of members between the new social contact group and the existing contact group. In another example, the rendering further includes showing content from one or more social applications. In another example, the rendering further includes showing links to one or more social applications. In another example, the rendering further includes showing members in the aggregated social contact group, in which the members are drawn from the plurality of social applications. In another example, the rendering further includes showing the aggregated social contact group with other different aggregated social contact groups. In another example, the method further includes configuring the UI to enable a user of the electronic device to pin the aggregated social contact group to one of home screen, hub, pivot, or centralized location supported on the electronic device. In another example, the rendering further includes dynamically updating the aggregated social contact group with content or information.

A further example includes an electronic device, comprising: one or more processors; a display that supports a user interface (UI) for conveying information and interacting with a user of the electronic device; and a memory device storing computer-readable instructions which, when executed by the one or more processors, cause the electronic device to: track one or more existing groups of social contacts that are associated with the user, monitor for events occurring on the electronic device that pertain to one of creation of a new group of social contacts, or importation of a new group of social contacts, match the new group of social contacts to an existing group of social contacts based on one or more matching factors, aggregate the social contacts in the new group with the social contacts in the matching existing group, and render the aggregated group of social contacts on the display.

In another example, the electronic device further includes a touchscreen and microphone and in which user inputs comprise one or more of touch-based gestures, visual gestures, or voice inputs. In another example, the matching factors comprise at least one of similarity between names of the new group of social contacts and an existing group of social contacts, degree of linking among members in the new group of social contacts and the existing group of social contacts, or similarity of profiles among members in the new group of social contacts and the existing group of social contacts. In another example, the electronic device further configures the UI to enable the user to perform one or more of setting preferences, controlling the aggregation of the group of social contacts, or controlling rendering of the aggregated group of social contacts on the device. In another example, the electronic device further provides a notification to the user on the UI that social contact group aggregation is available and receives user input in response to the notification. In another example, the electronic device further enables the user to interact with the aggregated group of social contacts using the UI.

A further example includes one or more computer-readable storage media storing instructions which, when executed by one or more processors disposed in a device, implement a social contact group aggregation system on the device to: detect a new social contact group that is associated with a device user; upon detection of the new social contact group, identify a similar existing social contact group that is associated with the device user based on social contact group name or a degree to which members overlap between the new social contact group and the existing social contact group; if a similar existing social contact group is identified, combine the new social contact group and the similar existing social contact group into an aggregated social contact group; provide the device user with a user interface (UI) to interact with the aggregated social contact group; and render content from one or more social applications on the UI.

In another example, the social contact group aggregation system further makes a recommendation through a user interface (UI) supported on the device to aggregate the new social contact group with the existing social contact group. In another example, the social contact group aggregation system further interacts with one or more remote systems that are associated with respective one or more of the social applications. In another example, the new social contact group is created by the device user or imported to the device.

Based on the foregoing, it may be appreciated that technologies for automated aggregation of social contact groups have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for aggregating social contact groups associated with a plurality of social applications available to an electronic device, in which each social contact group has social contact members, comprising:

maintaining a list of a plurality of existing social contact groups available to the electronic device, at least some of the plurality of existing social contact groups being respectively associated with different social network applications, and wherein each of the plurality of existing social contact groups contains a plurality of social contacts;

monitoring occurrences of creation or importation of new social contact groups;

determining whether a new social contact group has a predetermined similarity to one of the plurality of existing social contact groups contained in a social network application that is different from one in which the new social contact group is contained, and wherein the determination is based on a comparison of associative factors between the new social contact group and the existing social contact groups, other than social contact group name, in which the associative factors comprise at least one of commonality of group member profile between the new social contact group and the existing social contact groups, or pre-existing linkage between one or more group members in the new social contact group and the existing social contact groups;

responsively to the determination, combining members from the new social contact group and the matching existing social contact group into an aggregated social contact group; and rendering the aggregated social contact group on a user interface (UI) supported by the electronic device.

2. The method of claim 1 further including enabling a user of the electronic device to interact with the rendered aggregated social contact group through the UI.

3. The method of claim 1 in which the rendering further includes showing content from one or more social applications.

4. The method of claim 1 in which the rendering further includes showing links to one or more social applications.

5. The method of claim 1 in which the rendering further includes showing members in the aggregated social contact group, in which the members are drawn from the plurality of social applications.

6. The method of claim 1 in which the rendering further includes showing the aggregated social contact group with other different aggregated social contact groups.

7. The method of claim 1 further including configuring the UI to enable a user of the electronic device to pin the aggregated social contact group to one of home screen, hub, pivot, or centralized location supported on the electronic device.

8. The method of claim 1 in which the rendering further includes dynamically updating the aggregated social contact group with content or information.

9. An electronic device, comprising:

one or more processors;

a display that supports a user interface (UI) for conveying information and interacting with a user of the electronic device; and a memory device storing computer-readable instructions which, when executed by the one or more processors, cause the electronic device to:

track multiple existing groups of social contacts that are associated with the user wherein one or more of the existing groups of social contacts are respectively associated with one or more social networking applications, monitor for events occurring on the electronic device that pertain to one of creation of a new group of social contacts, or importation of a new group of social contacts, match the new group of social contacts to an existing group among the multiple existing groups of social contacts based on one or more matching factors, based on a comparison of associative factors between the new social contact group and the existing social contact groups, other than social contact group name, in which the associative factors comprise at least one of commonality of group member profile between the new social contact group and the existing social contact groups, or pre-existing linkage between one or more group members in the new social contact group and the existing social contact groups, aggregate the social contacts in the new group with the social contacts in the matching existing group, and render the aggregated group of social contacts on the display.

10. The electronic device of claim 9 further including a touchscreen and microphone and in which user inputs comprise one or more of touch-based gestures, visual gestures, or voice inputs.

11. The electronic device of claim 9 in which the matching factors comprise at least one of similarity between names of the new group of social contacts and an existing group of social contacts, degree of linking among members in the new group of social contacts and the existing group of social contacts, or similarity of profiles among members in the new group of social contacts and the existing group of social contacts.

12. The electronic device of claim 9 in which the electronic device further configures the UI to enable the user to perform one or more of setting preferences, controlling the aggregation of the group of social contacts, or controlling rendering of the aggregated group of social contacts on the device.

13. The electronic device of claim 9 in which the electronic device further provides a notification to the user on the UI that social contact group aggregation is available and receives user input in response to the notification.

14. The electronic device of claim 13 in which the electronic device further enables the user to interact with the aggregated group of social contacts using the UI.

15. One or more computer-readable storage media storing instructions which, when executed by one or more processors disposed in a device, implement a social contact group aggregation system on the device to:
 detect a new social contact group that is associated with a device user;
 upon detection of the new social contact group, identify a similar existing social contact group, from multiple distinct social contact groups, that is associated with the device user based on a comparison of associative factors between the new social contact group and the existing social contact groups, other than social contact group name, in which the associative factors comprise at least one of commonality of group member profile between the new social contact group and the existing social contact groups, or pre-existing linkage between one or more group members in the new social contact group and the existing social contact groups;
 responsively to a similar existing social contact group being identified, combine the new social contact group and the similar existing social contact group into an aggregated social contact group;
 provide the device user with a user interface (UI) to interact with the aggregated social contact group; and
 render content from one or more social applications on the UI.

16. The one or more computer-readable storage media of claim 15 in which the social contact group aggregation system further makes a recommendation through a user interface (UI) supported on the device to aggregate the new social contact group with the existing social contact group.

17. The one or more computer-readable storage media of claim 15 in which the social contact group aggregation system further interacts with one or more remote systems that are associated with respective one or more of the social applications.

18. The one or more computer-readable storage media of claim 15 in which the new social contact group is created by the device user or imported to the device.

* * * * *